US010184695B2

(12) United States Patent
Honda

(10) Patent No.: US 10,184,695 B2
(45) Date of Patent: Jan. 22, 2019

(54) HEAT PUMP SYSTEM HAVING CONTROLLABLE FLOW RATE ADJUSTMENT VALVES

(75) Inventor: Masahiro Honda, Sakai (BE)

(73) Assignees: Daikin Industries, Ltd., Osaka (JP); DAIKIN EUROPE N.V., Oostende (BE)

(*) Notice: Subject to any disclaimer, the term of this patent is extended or adjusted under 35 U.S.C. 154(b) by 930 days.

(21) Appl. No.: 13/518,682

(22) PCT Filed: Dec. 28, 2009

(86) PCT No.: PCT/JP2009/007347
§ 371 (c)(1),
(2), (4) Date: Jun. 22, 2012

(87) PCT Pub. No.: WO2011/080800
PCT Pub. Date: Jul. 7, 2011

(65) Prior Publication Data
US 2012/0260688 A1    Oct. 18, 2012

(51) Int. Cl.
*F25B 13/00* (2006.01)
*F25B 49/02* (2006.01)

(52) U.S. Cl.
CPC ............ *F25B 13/00* (2013.01); *F25B 49/022* (2013.01); *F25B 2313/003* (2013.01);
(Continued)

(58) Field of Classification Search
CPC  F25B 25/005; F25B 7/00; F25B 2700/21173; F25B 2313/021–2313/0215;
(Continued)

(56) References Cited

U.S. PATENT DOCUMENTS 4,420,947 A * 12/1983 Yoshino ............. F24D 11/0264
126/585
4,698,981 A * 10/1987 Kaneko .................. F25B 13/00
62/180
(Continued)

FOREIGN PATENT DOCUMENTS

JP      1-73661 U      5/1989
JP      2-57875 A      2/1990
(Continued)

OTHER PUBLICATIONS

International Preliminary Report of corresponding PCT Application No. PCT/JP2009/007347.
(Continued)

*Primary Examiner* — Ned Landrum
*Assistant Examiner* — Daniel C Comings
(74) *Attorney, Agent, or Firm* — Global IP Counselors, LLP

(57) ABSTRACT

A heat source unit has a capacity-variable heat source-side compressor and a heat source-side heat exchanger which functions as a radiator of refrigerant. Usage units are connected to the heat source unit and have usage-side heat exchangers, respectively, which function as evaporators of refrigerant and cool an aqueous medium. An operating capacity controller controls the capacity of the heat source-side compressor so that evaporation temperature of refrigerant of each of the usage-side heat exchangers reaches a first target evaporation temperature. A decision unit calculates second target evaporation temperatures at which outlet temperatures of the aqueous medium in the usage-side heat exchangers of the respective operating usage units reach predetermined set temperatures, and decides a minimum value of the second target evaporation temperatures as the first target evaporation temperature.

18 Claims, 10 Drawing Sheets

(52) U.S. Cl.
CPC . *F25B 2313/023* (2013.01); *F25B 2313/0233* (2013.01); *F25B 2313/02741* (2013.01); *F25B 2313/0314* (2013.01); *F25B 2600/02* (2013.01); *F25B 2600/13* (2013.01); *F25B 2600/2511* (2013.01); *F25B 2600/2513* (2013.01); *F25B 2700/2117* (2013.01); *F25B 2700/21171* (2013.01); *F25B 2700/21173* (2013.01); *F25B 2700/21174* (2013.01); *F25B 2700/21175* (2013.01); *Y02B 30/745* (2013.01)

(58) Field of Classification Search
CPC .... F25B 2313/0233; F25B 2313/02333; F25B 2700/2117; F25B 2700/21171; F25B 2700/21172; F25B 2700/21174; F25B 2700/21175; F25B 2313/003; F25B 2313/02331
USPC .................................. 62/199, 203, 204, 335
See application file for complete search history.

(56) References Cited

U.S. PATENT DOCUMENTS

| | | | | |
|---|---|---|---|---|
| 5,035,119 A * | 7/1991 | Alsenz | ................. | F25B 41/062 62/129 |
| 5,963,458 A * | 10/1999 | Cascia | .................... | F25B 49/02 165/200 |
| 2007/0151287 A1* | 7/2007 | Yahia | ..................... | F25B 5/02 62/525 |
| 2010/0043467 A1* | 2/2010 | Kawano | ................. | F25B 13/00 62/129 |

FOREIGN PATENT DOCUMENTS

| | | | |
|---|---|---|---|
| JP | 2007-163099 A | 6/2007 | |
| JP | 2007-183089 A | 7/2007 | |
| JP | 2008138954 | * 11/2008 | |
| JP | 2009-236393 A | 10/2009 | |
| WO | 89/06774 A1 | 7/1989 | |
| WO | WO 2014/038469 A1 * | 3/2014 | .............. F25B 27/02 |

OTHER PUBLICATIONS

European Search Report of corresponding EP Application No. 09 84 5946.4 dated May 2, 2013.
International Search Report of corresponding PCT Application No. PCT/JP2009/007347.

* cited by examiner

HEAT PUMP SYSTEM HAVING CONTROLLABLE FLOW RATE ADJUSTMENT VALVES

TECHNICAL FIELD

The present invention relates to a heat pump system, and particularly relates to a heat pump system in which an aqueous medium can be cooled using a heat pump cycle.

BACKGROUND ART

In conventional practice, there have been systems in which a plurality of usage units are connected to a single heat source unit, such as the system disclosed in Japanese Laid-open Patent Application No. 2007-163099. In this system, a vapor-compression-type refrigerant circuit is configured by connecting a single heat source unit, a plurality of usage units, a liquid refrigerant communication tube, and a gas refrigerant communication tube.

SUMMARY

Technical Problem

In the system described above, a chiller-type system is employed, wherein an aqueous medium is used as the usage fluid of the usage units, and the system is presented as being capable of using water of different temperatures by allowing the temperature of the aqueous medium to differ with each usage unit. In this case, a method is presented in which the system constantly operates at the minimum water temperature predicted among all the usage units, but with this method, there is a risk that the operating efficiency will decrease more than is necessary.

In view of this, an object of the present invention is to prevent inefficient operation from unnecessarily taking place in a system in which a plurality of usage units that use an aqueous medium are connected to a single heat source unit.

Solution to Problem

A heat pump system according to a first aspect of the present invention comprises a heat source unit, a plurality of usage units, an operation capacity controller, and a temperature decision unit. The heat source unit has a compressor and a heat source-side heat exchanger. The compressor is a variable-capacity-type compressor for compressing refrigerant. The heat source-side heat exchanger is capable of functioning as a radiator of refrigerant. Each of the plurality of usage units are connected to the heat source unit and have usage-side heat exchangers. The usage-side heat exchangers function as evaporators of refrigerant and can cool an aqueous medium. The operating capacity controller performs operating capacity control on the compressor on that the evaporation temperature of the refrigerant in each of the usage-side heat exchangers reaches a first target evaporation temperature. The temperature decision units calculate as second target evaporation temperatures the evaporation temperatures for allowing the temperature of the aqueous medium in the outlets of the usage-side heat exchangers in the respective operating usage units to reach a predetermined set temperature. The temperature decision units then decide the minimum value of the second target evaporation temperatures as the first target evaporation temperature.

In this heat pump system, when the aqueous medium is cooled in the usage units, the minimum value of the second target evaporation temperatures for allowing the temperature of the aqueous medium in the outlets of the usage-side heat exchangers of each of the usage units to reach the predetermined set temperatures is decided as the first target evaporation temperature. Operation capacity control is then performed on the compressor so that the evaporation temperatures of the refrigerant in each of the usage-side heat exchangers reach the minimum value of the second target evaporation temperatures (i.e. the first target evaporation temperature). Thereby, in a heat pump system in which a plurality of usage units having different set temperatures respectively for the aqueous medium are connected to a single heat source, an aqueous medium of the optimal temperature is supplied to each of the usage units. Therefore, it is possible to achieve a system wherein water of different temperatures can be used without using a method in which operation in all of the usage units constantly takes place at the predicted minimum water temperature, and it is therefore possible to prevent inefficient operation from unnecessarily taking place.

A heat pump system according to a second aspect of the present invention is the heat pump system according to the first aspect, further comprising flow rate adjustment valves and an opening degree controller. The flow rate adjustment valves are capable of varying the flow rates of the refrigerant flowing through the usage-side heat exchangers. The opening degree controller performs a control for varying the opening degrees of the flow rate adjustment valves when the evaporation temperatures or the first target evaporation temperature are less than the second target evaporation temperatures and the temperatures of the aqueous medium in the outlets of the usage-side heat exchangers are less than the predetermined set temperatures.

When operating capacity control is performed on the compressor of the heat source unit on the basis of the minimum value (i.e. the first target evaporation temperature) of the respective second target evaporation temperatures of the plurality of usage units, there is a risk, depending on the usage units, that the evaporation temperatures or the first target evaporation temperature will be less than the second target evaporation temperatures and the temperatures of the aqueous medium in the outlets of the usage-side heat exchangers will be less than the predetermined set temperatures. However, in this heat pump system, in the case of such an occurrence, control is performed for varying the opening degrees of the flow rate adjustment valves. Thereby, the flow rates of the refrigerant flowing in the usage-side heat exchangers can be controlled, and the temperatures of the aqueous medium of each of the usage units can be adjusted.

A heat pump system according to a third aspect of the present invention is the heat pump system according to the second aspect, wherein the opening degree controller performs a control for reducing the opening degrees of the flow rate adjustment valves when the evaporation temperatures or the first target evaporation temperature are less than the second target evaporation temperatures and the outlet temperatures of the aqueous medium in the usage-side heat exchangers are less than the predetermined set temperatures, whereby the outlet temperatures of the aqueous medium in the usage-side heat exchangers reach the predetermined set temperatures.

In this heat pump system, the opening degrees of the flow rate adjustment valves are reduced when the evaporation temperatures or the first target evaporation temperature are less than the second target evaporation temperatures and the outlet temperatures of the aqueous medium in the usage-side heat exchangers are less than the predetermined set temperatures. Since the flow rates of the refrigerant flowing within the usage-side heat exchangers are therefore reduced, the heat exchange capability between the aqueous medium and the refrigerant in the usage-side heat exchangers becomes less than before the opening degrees of the flow rate adjustment valves were reduced, and the temperature of the aqueous medium after heat exchange in the usage-side heat exchangers consequently becomes higher than before the opening degrees of the flow rate adjustment valves were reduced. Therefore, the temperatures of the aqueous medium in each of the usage units are optimized.

A heat pump system according to a fourth aspect of the present invention is the heat pump system according to any of the first through third aspects, further comprising aqueous medium circuits and a pump capacity controller. The aqueous medium circuits have capacity-variable-type circulation pumps and circulate an aqueous medium that undergoes heat exchange with the refrigerant in the usage-side heat exchangers. The pump capacity controller performs a control for varying the operating capacity of the circulation pumps when the evaporation temperatures or the first target evaporation temperature are less than the second target evaporation temperatures and the temperatures of the aqueous medium in the outlets of the usage-side heat exchangers are less than the predetermined set temperatures.

When operating capacity control is performed on the compressor of the heat source unit on the basis of the minimum value (i.e., the first target evaporation temperature) of the respective second target evaporation temperatures of the plurality of usage units, there is a risk, depending on the usage units, that the evaporation temperatures or the first target evaporation temperature will be less than the second target evaporation temperatures and the temperatures of the aqueous medium in the outlets of the usage-side heat exchangers will be less than the predetermined set temperatures. However, in this heat pump system, in the case of such an occurrence, control is performed for varying the operating capacities of the circulation pumps. Thereby, the flow rates of the aqueous medium circulating within the aqueous medium circuits can be controlled, and the temperatures of the aqueous medium of each of the usage units can be adjusted.

A heat pump system according to a fifth aspect of the present invention is the heat pump system according to the fourth aspect, wherein the pump capacity controller controls the operating capacities of the circulation pumps so that an outlet/inlet temperature difference reaches a predetermined temperature difference. The outlet/inlet temperature difference is the difference between the temperatures of the aqueous medium in the outlets of the usage-side heat exchangers and the temperatures of the aqueous medium in the inlets of the usage-side heat exchangers. Furthermore, the pump capacity controller performs a control for lowering the operating capacities of the circulation pumps so that the temperatures of the aqueous medium in the inlets of the usage-side heat exchangers reach a value obtained by subtracting the predetermined temperature difference from the predetermined set temperature when the evaporation temperatures or the first target evaporation temperature are less than the second target evaporation temperatures and the temperatures of the aqueous medium in the outlets of the usage-side heat exchangers are less than the predetermined set temperatures.

In this heat pump system, the operating capacities of the circulation pumps are controlled so that the outlet/inlet temperature difference of the usage-side heat exchangers reaches the predetermined temperature difference. Particularly, when the evaporation temperatures or the first target evaporation temperature are less than the second target evaporation temperatures and the outlet temperatures of the aqueous medium in the usage-side heat exchangers are less than the predetermined set temperatures, operating capacity control is performed on the circulation pumps so that the inlet temperatures of the aqueous medium of the usage-side heat exchangers reach a value obtained by subtracting the predetermined temperature difference from the predetermined set temperature. The outlet temperatures of the aqueous medium of the usage-side heat exchangers can thereby be controlled to a temperature obtained by adding the predetermined temperature difference to the inlet temperatures, i.e., the predetermined set temperature. Therefore, the temperatures of the aqueous medium of each of the usage units are optimized.

A heat pump system according to a sixth aspect of the present invention is the heat pump system according to the fourth or fifth aspect, further comprising flow rate adjustment valves and an opening degree controller. The flow rate adjustment valves are capable of varying the flow rates of the refrigerant flowing through the usage-side heat exchangers. The opening degree controller performs a control for varying the opening degrees of the flow rate adjustment valves when the evaporation temperatures or the first target evaporation temperature are less than the second target evaporation temperatures and the temperatures of the aqueous medium in the outlets of the usage-side heat exchangers are less than the predetermined set temperatures. The pump capacity controller performs a control varying the operating capacities of the circulation pumps when the temperatures of the aqueous medium in the outlets of the usage-side heat exchangers are less than the predetermined set temperatures after opening degree control has been performed on the flow rate adjustment valves by the opening degree controller.

When operating capacity control is performed on the compressor of the heat source unit on the basis of the minimum value (i.e., the first target evaporation temperature) of the respective second target evaporation temperatures of the plurality of usage units, there is a risk, depending on the usage units, that the evaporation temperatures or the first target evaporation temperature will be less than the second target evaporation temperatures and the temperatures of the aqueous medium in the outlets of the usage-side heat exchangers will be less than the predetermined set temperatures. However, in this heat pump system, in the case of such an occurrence, opening degree control is first performed on the flow rate adjustment valves. In cases in which the outlet temperatures of the aqueous medium of the usage-side heat exchangers have not yet reached the predetermined set temperatures even though the opening degree control has been performed, variable control is performed on the operating capacities of the circulation pumps. That is, in the case of the occurrence described above, the flow rates of refrigerant flowing through the usage-side heat exchangers are first adjusted, and when, despite this, the outlet temperatures of the aqueous medium do not reach the predetermined set temperatures, the flow rates of the aqueous medium circulating within the aqueous medium circuits are adjusted. Thereby, the temperatures of the aqueous medium of each of the usage units can be reliably optimized.

Advantageous Effects of Invention

As stated in the above descriptions, the following effects are obtained according to the present invention.

With the system according to the first aspect, it is possible to achieve a system wherein water of different temperatures can be used without using a method in which operation in all of each of the usage units constantly takes place at the predicted minimum water temperature, and it is therefore possible to prevent inefficient operation from unnecessarily taking place.

With the system according to the second aspect, the flow rates of the refrigerant flowing in the usage-side heat exchangers can be controlled, and the temperatures of the aqueous medium of each of the usage units can be adjusted.

With the system according to the third aspect, the temperatures of the aqueous medium in each of the usage units are optimized.

With the system according to the fourth aspect, the flow rates of the aqueous medium circulating within the aqueous medium circuits can be controlled, and the temperatures of the aqueous medium of each of the usage units can be adjusted.

With the system according to the fifth aspect, the temperatures of the aqueous medium of each of the usage units are optimized.

With the system according to the sixth aspect, the temperatures of the aqueous medium of each of the usage units can be reliably optimized.

DESCRIPTION OF EMBODIMENTS

An embodiment of a heat pump system according to the present invention is described hereinbelow based on the drawings.

<Configuration>

—Entire Structure—

Figure 1:
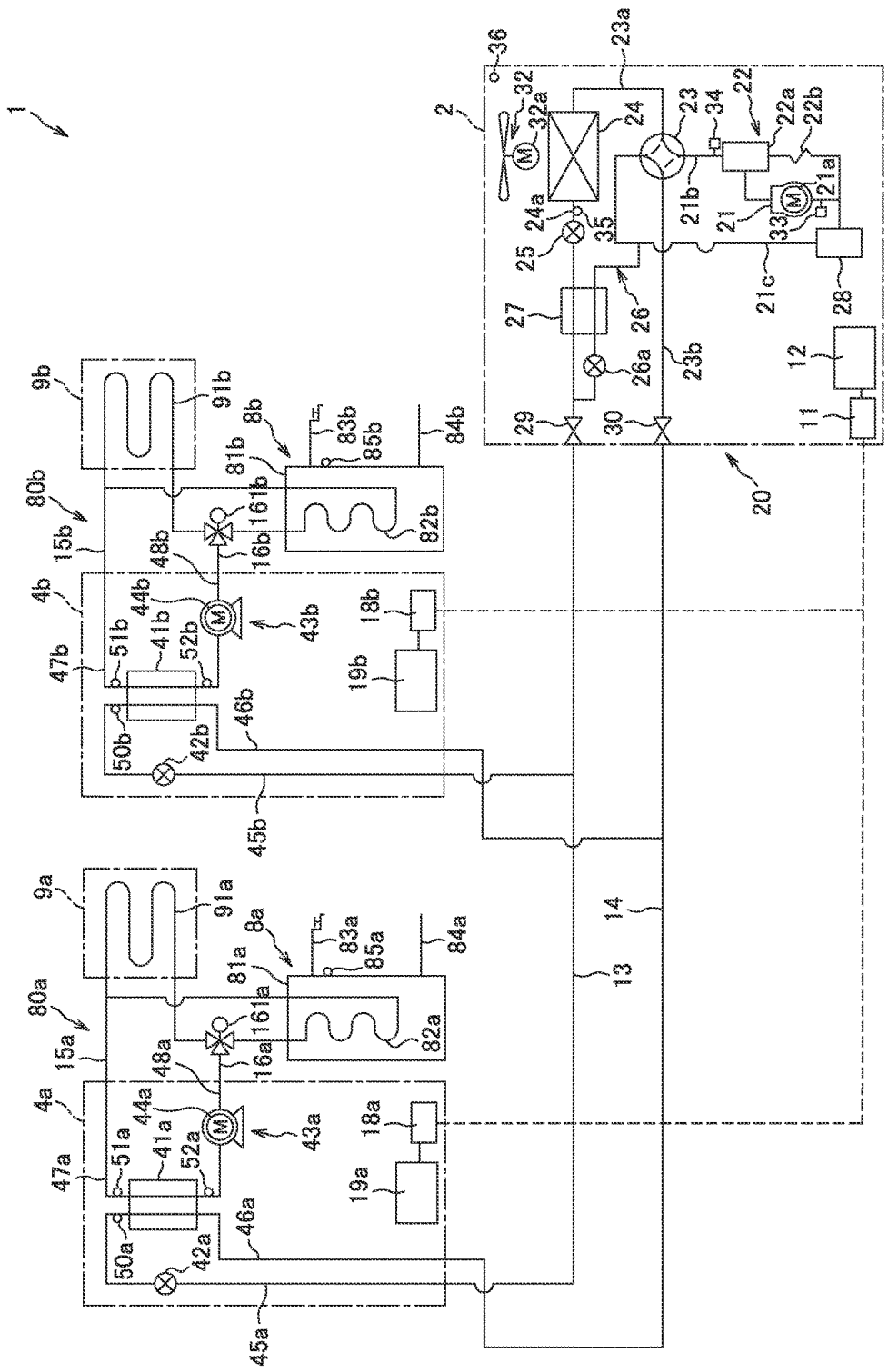
FIG. 1 is a schematic configuration view of a heat pump system according to the present embodiment.

FIG. 1 is a schematic configuration view of a heat pump system 1 according to an embodiment of the present invention. The heat pump system 1 is an apparatus capable of performing an operation, for example, for cooling an aqueous medium by using a vapor compressor-type heat pump cycle.

The heat pump system 1 comprises primarily one heat source unit 2, two usage units 4a, 4b, a liquid refrigerant communication tube 13, a gas refrigerant communication tube 14, two hot-water storage units 8a, 8b, two water usage cooling/warming units 9a, 9b, aqueous medium communication tubes 15a, 15b, 16a, 16b, a heat source-side correspondence unit 11, a heat source-side controller 12, usage-side correspondence units 18a, 18b, and usage-side controllers 19a, 19b. The heat source unit 2 and the usage units 4a, 4b are connected to each other via the liquid refrigerant communication tube 13 and the gas refrigerant communication tube 14, thereby constituting a heat source-side refrigerant circuit 20. The heat source-side refrigerant circuit 20 is configured primarily from a heat source-side compressor 21 (described hereinafter), a heat source-side heat exchanger 24 (described hereinafter), and a usage-side heat exchanger 41a (described hereinafter). Each of the usage units 4a, 4b, each of the hot-water storage units 8a, 8b, and each of the water usage cooling/warming units 9a, 9b are connected via the aqueous medium communication tubes 15a, 15b, 16a, 16b, thereby constituting aqueous medium circuits 80a, 80b.

Enclosed inside the heat source-side refrigerant circuit 20 are HFC-410A as a heat source-side refrigerant, which is an HFC-based refrigerant, and an ester-based or ether-based refrigerating machine oil which is compatible with the HFC-based refrigerant and which is enclosed in order to lubricate the heat source-side compressor 21 (described hereinafter). Water as an aqueous medium circulates through the aqueous medium circuits 80a, 80b.

Each of the usage units 4a, 4b and the groups of units connected thereto have the same configuration in which a group consisting of the combination of the usage unit 4a, the hot-water storage unit 8a, and the water usage cooling/warming unit 9a (a group denoted by symbols including the letter "a"); and a group consisting of the combination of the usage unit 4b, the hot-water storage unit 8b, and the water usage cooling/warming unit 9b (a group denoted by symbols including the letter "b"). These groups are connected in parallel to each other and to the liquid refrigerant communication tube 13 and the gas refrigerant communication tube 14.

To simplify the description hereinbelow, a case is described in which two usage units 4a, 4b are installed in the heat pump system 1, but the installed number of usage units 4a, 4b may be two or more, and the installed number is not limited to two. Similarly, the installed numbers of hot-water storage units 8a, 8b and water usage cooling/warming units 9a, 9b both may be two or more, and these installed numbers are also not limited to two.

—Heat Source Unit—

The heat source unit 2 is installed outdoors. The heat source unit 2 is connected to each of the usage units 4a, 4b via the liquid refrigerant communication tube 13 and the gas refrigerant communication tube 14, and the heat source unit 2 constitutes part of the heat source-side refrigerant circuit 20.

The heat source unit 2 has primarily the heat source-side compressor 21, an oil separation mechanism, a heat source-side switching mechanism 23, the heat source-side heat exchanger 24, a heat source-side expansion valve 25, an intake return tube 26, a supercooler 27, a heat source-side accumulator 28, a liquid-side shut-off valve 29, and a gas-side shut-off valve 30.

The heat source-side compressor 21 is a mechanism for compressing the heat source-side refrigerant, and is a capacity-variable-type compressor. Specifically, it is a hermetic-type compressor wherein a rotary-type, scroll-type, or other volume-type compression element (not shown) housed within a casing (not shown) is driven by a heat source-side compression motor 21a housed within the same casing. Inside the casing of the heat source-side compressor 21 is formed a high-pressure space (not shown) in which the heat source-side refrigerant fills after being compressed in the compression element, and refrigerating machine oil is accumulated in this high-pressure space. The heat source-side compression motor 21a can vary the rotational speed (i.e., the operating frequency) of the motor 21a by an inverter device (not shown), whereby the capacity of the heat source-side compressor 21 can be controlled. The oil separation mechanism 22 is a mechanism for separating the refrigerating machine oil contained in the heat source-side refrigerant discharged from the heat source-side compressor 21 and returning the oil to the intake of the heat source-side compressor. The oil separation mechanism 22 has primarily an oil separator 22a provided to a heat source-side discharge tube 21b of the heat source-side compressor 21, and an oil return tube 22b for connecting the oil separator 22a and a heat source-side intake tube 21c of the heat source-side compressor 21. The oil separator 22a is a device for separating the refrigerating machine oil contained in the heat source-side refrigerant discharged from the heat source-side compressor 21. The oil return tube 22b has a capillary tube. The oil return tube 22b is a refrigerant tube for returning the refrigerating machine oil separated from the heat source-side refrigerant in the oil separator 22a to the heat source-side intake tube 21c of the heat source-side compressor 21.

The heat source-side switching mechanism 23 is a four-way switching valve capable of switching between a heat source-side heat-radiating operation state in which the heat source-side heat exchanger 24 is made to function as a radiator of the heat source-side refrigerant, and a heat source-side evaporating operation state in which the heat source-side heat exchanger 24 is made to function as an evaporator of the heat source-side refrigerant. The heat source-side switching mechanism 23 is connected to the heat source-side discharge tube 21b, the heat source-side intake tube 21c, a first heat source-side gas refrigerant tube 23a connected to the gas side of the heat source-side heat exchanger 24, and a second heat source-side gas refrigerant tube 23b connected to the gas-side shut-off valve 30. The heat source-side switching mechanism 23 is capable of switching between an action of which the heat source-side discharge tube 21b communicates with the first heat source-side gas refrigerant tube 23a and the second heat source-side gas refrigerant tube 23b communicates with the heat source-side intake tube 21c (equivalent to the heat source-side heat-radiating state, refer to the solid lines of the heat source-side switching mechanism 23 in FIG. 1), and another action of which the heat source-side discharge tube 21b communicates with the second heat source-side gas refrigerant tube 23b and the first heat source-side gas refrigerant tube 23a with the heat source-side intake tube 21c (equivalent to the heat source-side evaporating operation state, refer to the dashed lines of the heat source-side switching mechanism 23 in FIG. 1).

The heat source-side switching mechanism 23 is not limited to a four-way switching valve, and may be configured so as to have a function for switching the flow direction of the same heat source-side refrigerant as is described above by combining a plurality of electromagnetic valves, for example.

The heat source-side heat exchanger 24 is a heat exchanger which functions as a radiator or an evaporator of the heat source-side refrigerant by performing heat exchange between the heat source-side refrigerant and outdoor air. A heat source-side liquid refrigerant tube 24a is connected to the liquid side of the heat source-side heat exchanger 24, and the first heat source-side gas refrigerant tube 23a is connected to the gas side of the heat source-side heat exchanger 24. The outdoor air that undergoes heat exchange with the heat source-side refrigerant in the heat source-side heat exchanger 24 is supplied by a heat source-side fan 32 driven by a heat source-side fan motor 32a.

The heat source-side expansion valve 25 is an electric expansion valve for depressurizing or otherwise treating the heat source-side refrigerant flowing through the heat source-side heat exchanger 24, and is provided to the heat source-side liquid refrigerant tube 24a.

The intake return tube 26 is a refrigerant tube for branching off some of the heat source-side refrigerant flowing through the heat source-side liquid refrigerant tube 24a and returning the refrigerant to the intake of the heat source-side compressor 21. One end of the intake return tube 26 is connected to the heat source-side liquid refrigerant tube 24a, and the other end of the tube 26 is connected to the heat source-side intake tube 21c. An intake return expansion valve 26a whose opening degree can be controlled is provided to the intake return tube 26. The intake return expansion valve 26a is configured from an electric expansion valve.

The supercooler 27 is a heat exchanger that performs heat exchange between the heat source-side refrigerant flowing through the heat source-side liquid refrigerant tube 24a and the heat source-side refrigerant flowing through the intake return tube 26 (more specifically, the refrigerant that has been depressurized by the intake return expansion valve 26a).

The heat source-side accumulator 28 is provided to the heat source-side intake tube 21c, and is a container for primarily accumulating the heat source-side refrigerant circulating through the heat source-side refrigerant circuit 20 before the refrigerant is drawn from the heat source-side intake tube 21c into the heat source-side compressor 21.

The liquid-side shut-off valve 29 is a valve provided to the connecting portion between the heat source-side liquid refrigerant tube 24a and the liquid refrigerant communication tube 13. The gas-side shut-off valve 30 is a valve provided to the connecting portion between the second heat source-side gas refrigerant tube 23b and the gas refrigerant communication tube 14.

Various sensors are provided to the heat source unit 2. Specifically, the heat source unit 2 is provided with a heat source-side intake pressure sensor 33, a heat source-side discharge pressure sensor 34, a heat source-side heat exchange temperature sensor 35, and an outdoor air temperature sensor 36. The heat source-side intake pressure sensor 33 detects the heat source-side intake pressure Ps, which is the pressure of the heat source-side refrigerant being drawn into the heat source-side compressor 21. The heat source-side discharge pressure sensor 34 detects the heat source-side discharge pressure Pd, which is the pressure of the heat source-side refrigerant being discharged from the heat source-side compressor 21. The heat source-side heat exchange temperature sensor 35 detects the heat source-side heat exchanger temperature Thx, which is the temperature of the heat source-side refrigerant in the liquid side of the heat source-side heat exchanger 24. The outdoor air temperature sensor 36 detects the outdoor air temperature To.

—Liquid Refrigerant Communication Tube—

The liquid refrigerant communication tube 13 is connected to the heat source-side liquid refrigerant tube 24a via the liquid-side shut-off valve 29. The liquid refrigerant communication tube 13 is a refrigerant tube capable of leading the heat source-side refrigerant out of the heat source unit 2 through the outlet of the heat source-side heat exchanger 24 functioning as a radiator of the heat source-side refrigerant when the heat source-side switching mechanism 23 is in the heat source-side heat-radiating operation state. The liquid refrigerant communication tube 13 is a refrigerant tube capable of leading the heat source-side refrigerant from the exterior of the heat source unit 2 into the inlet of the heat source-side heat exchanger 24 functioning as an evaporator of the heat source-side refrigerant when the heat source-side switching mechanism 23 is in the heat source-side evaporating operation state.

—Gas Refrigerant Communication Tube—

The gas refrigerant communication tube 14 is connected to the second heat source-side gas refrigerant tube 23b via the gas-side shut-off valve 30. The gas refrigerant communication tube 14 is a refrigerant tube capable of leading the heat source-side refrigerant into the intake side of the heat source-side compressor 21 from the exterior of the heat source unit 2 when the heat source-side switching mechanism 23 is in the heat source-side heat-radiating operation state. The gas refrigerant communication tube 14 is also a refrigerant tube capable of leading the heat source-side refrigerant out of the heat source unit 2 through the discharge side of the heat source-side compressor 21 when the heat source-side switching mechanism 23 is in the heat source-side evaporating operation state.

—Usage Units—

The usage units 4a, 4b are both installed indoors. The usage units 4a, 4b are connected to the heat source unit 2 via the liquid refrigerant communication tube 13 and the gas refrigerant communication tube 14, constituting part of the heat source-side refrigerant circuit 20. Each of the usage units 4a, 4b are also connected to each of the hot-water storage units 8a, 8b and each of the water usage cooling/warming units 9a, 9b via the aqueous medium communication tubes 15a, 16a, 15b, 16b, constituting part of each of the aqueous medium circuits 80a, 80b.

The usage units 4a, 4b can perform an aqueous medium heating operation for heating the aqueous medium during an air-warming operation and a hot-water supply operation, and can perform an aqueous medium cooling operation for cooling the aqueous medium during an air-cooling operation. The usage units 4a, 4b have primarily usage-side heat exchangers 41a, 41b, usage-side flow rate adjustment valves 42a, 42b (equivalent to flow rate adjustment valves), and circulation pumps 43a, 43b.

The usage-side heat exchangers 41a, 41b perform heat exchange between the heat source-side refrigerant and the aqueous medium. Specifically, the usage-side heat exchangers 41a, 41b can heat the aqueous medium (i.e., the aqueous medium heating operation) by functioning as radiators of the heat source-side refrigerant during the air-warming operation and the hot-water supply operation. Conversely, the usage-side heat exchangers 41a, 41b can cool the aqueous medium (i.e., the aqueous medium cooling operation) by functioning as evaporators of the heat source-side refrigerant during the air-cooling operation. In the usage-side heat exchangers 41a, 41b, usage-side refrigerant tubes 45a, 45b are connected to the liquid sides of the flow passages through which the heat source-side refrigerant flows, and usage-side refrigerant tubes 46a, 46b are connected to the gas sides of the flow passages through which the heat source-side refrigerant flows. In the usage-side heat exchangers 41a, 41b, usage-side water inlet tubes 47a, 47b are connected to the inlet sides of the flow passages through which the aqueous medium flows, and usage-side water outlet tubes 48a, 48b are connected to the outlet sides of the flow passages through which the aqueous medium flows. The liquid refrigerant communication tube 13 is connected to the usage-side refrigerant tubes 45a, 45b, and the gas refrigerant communication tube 14 is connected to the usage-side refrigerant tubes 46a, 46b. The aqueous medium communication tubes 15a, 15b are connected to the usage-side water inlet tubes 47a, 47b, and the aqueous medium communication tubes 16a, 16b are connected to the usage-side water outlet tubes 48a, 48b.

The usage-side flow rate adjustment valves 42a, 42b are electric expansion valves in which flow rates of heat source-side refrigerant flowing through the usage-side heat exchangers 41a, 41b can be varied by adjusting the opening degrees of the adjustment valves 42a, 42b themselves. The usage-side flow rate adjustment valves 42a, 42b are connected to the usage-side refrigerant tubes 45a, 45b.

The circulation pumps 43a, 43b are mechanisms for increasing the pressure of the aqueous medium and are provided to the usage-side water outlet tubes 48a, 48b. Specifically, pumps in which centrifugal or volume-type pump elements (not shown) are driven by circulation pump motors 44a, 44b are used as the circulation pumps 43a, 43b. The rotational speeds (i.e., the operation frequencies) of the circulation pump motors 44a, 44b can be varied separately to different rotational speeds by an inverter device not shown), whereby the capacities of the circulation pumps 43a, 43b can be controlled.

Various sensors are provided to the usage units 4a, 4b. Specifically, the usage unit 4a, 4b is provided with usage-side heat exchange temperature sensors 50a, 50b, aqueous medium inlet temperature sensors 51a, 51b, and aqueous medium outlet temperature sensors 52a, 52b. The usage-side heat exchange temperature sensors 50a, 50b detect the usage-side refrigerant temperatures Tsc1a, Tsc1b, which are the temperatures of the heat source-side refrigerant in the liquid sides of each of the usage-side heat exchangers 41a, 41b. The aqueous medium inlet temperature sensors 51a, 51b detect the aqueous medium inlet temperatures Twra, Twrb, which are the temperatures of the aqueous medium in the inlets of each of the usage-side heat exchangers 41a, 41b. The aqueous medium outlet temperature sensors 52a, 52b detect the aqueous medium outlet temperatures Tw1a, Tw1b, which are the temperatures of the aqueous medium in the outlets of each of the usage-side heat exchangers 41a, 41b.

—Hot-water Storage Units—

The hot-water storage units 8a, 8b are aqueous medium devices which use the aqueous medium supplied from the usage units 4a, 4b, and are both installed indoors. The hot-water storage units 8a, 8b are connected to each of the usage units 4a, 4b via the aqueous medium communication tubes 15a, 16a, 15b, 16b, constituting part of each of the aqueous medium circuits 80a, 80b.

The hot-water storage units 8a, 8b have primarily hot-water storage tanks 81a, 81b and heat exchange coils 82a, 82b.

The hot-water storage tanks 81a, 81b are containers for accumulating water as the aqueous medium supplied for the hot water supply. Connected to the top portions of the hot-water storage tanks 81a, 81b are hot-water supply tubes 83a, 83b for feeding the aqueous medium that has been heated for a faucet, a shower, or the like, and connected to the bottom portions are water supply tubes 84a, 84b for replenishing the aqueous medium that has been consumed by the hot-water supply tubes 83a, 83b.

The heat exchange coils 82a, 82b are provided inside the hot-water storage tanks 81a, 81b. The heat exchange coils 82a, 82b are heat exchangers which function as heaters of the aqueous medium in the hot-water storage tanks 81a, 81b by performing heat exchange between the aqueous medium circulating through the aqueous medium circuits 80a, 80b and the aqueous medium in the hot-water storage tanks 81a, 81b. The aqueous medium communication tubes 16a, 16b are connected to the inlets of the heat exchange coils 82a, 82b, and the aqueous medium communication tubes 15a, 15b are connected to the outlets of the heat exchange coils 82a, 82b.

The hot-water storage units 8a, 8b are thereby capable of heating the aqueous medium in the hot-water storage tanks 81a, 81b and accumulating the aqueous medium as hot water by the aqueous medium heated in the usage units 4a, 4b and circulating through the aqueous medium circuits 80a, 80b during the hot-water supply operation and the air-warming operation. The type of hot-water storage unit used as the hot-water storage units 8a, 8b is one in which the aqueous medium heated by heat exchange with the aqueous medium heated in the usage units 4a, 4b accumulates in a hot-water storage tank, but another type that may be used, is a hot-water storage unit that accumulates in a hot-water storage tank the aqueous medium heated in the usage units 4a, 4b.

Various sensors are provided to the hot-water storage units 8a, 8b. Specifically, the hot-water storage units 8a, 8b are provided with hot-water storage temperature sensors 85a, 85b for detecting the hot-water storage temperatures Twha, Twhb, which are the temperatures of the aqueous medium accumulated in the hot-water storage tanks 81a, 81b.

—Water Usage Cooling/Warming Units—

The water usage cooling/warming units 9a, 9b are aqueous medium devices that use the aqueous medium supplied from the usage units 4a, 4b, and are both installed indoors. The water usage cooling/warming units 9a, 9b are connected to each of the usage units 4a, 4b via the aqueous medium communication tubes 15a, 15b, 16a, 16b, constituting part of each of the aqueous medium circuits 80a, 80b.

The water usage cooling/warming units 9a, 9b are units which can use the aqueous medium circulating within the aqueous medium circuits 80a, 80b to perform the air-cooling operation and the air-warming operation. Such water usage cooling/warming units 9a, 9b primarily have heat exchange panels 91a, 91b and constitute convectors, floor cooling/heating panels, or the like.

When the heat exchange panels 91a, 91b are convectors, they are provided alongside a wall in a room, for example, and when the heat exchange panels 91a, 91b are floor cooling/heating panels, they are provided under floor in a room or the like, for example. The heat exchange panels 91a, 91b are heat exchangers which function as radiators or heat absorbers of the aqueous medium circulating through the aqueous medium circuits 80a, 80b. The aqueous medium communication tubes 16a, 16b are connected to the inlets of the heat exchange panels 91a, 91b, and the aqueous medium communication tubes 15a, 15b are connected to the outlets of each of the heat exchange panels 91a, 91b.

—Aqueous Medium Communication Tubes—

The aqueous medium communication tubes 15a, 15b are connected respectively to the outlets of the heat exchange coils 82a, 82b of each of the hot-water storage units 8a, 8b and to the outlets of the heat exchange panels 91a, 91b of each of the water usage cooling/warming units 9a, 9b. The aqueous medium communication tubes 16a, 16b are connected respectively to the inlets of the heat exchange coils 82a, 82b of each of the hot-water storage units 8a, 8b and to the inlets of the heat exchange panels 91a, 91b of each of the water usage cooling/warming units 9a, 9b. The aqueous medium communication tubes 16a, 16b are provided with aqueous medium-side switching mechanisms 161a, 161b capable of switching between supplying the aqueous medium circulating through the aqueous medium circuits 80a, 80b to both the hot-water storage units 8a, 8b and the water usage cooling/warming units 9a, 9b, and supplying the aqueous medium either one of the hot-water storage units 8a, 8b and the water usage cooling/warming units 9a, 9b. These aqueous medium-side switching mechanisms 161a, 161b are configured from three-way valves.

—Heat Source-Side Correspondence Unit—

The heat source-side correspondence unit 11 is electrically connected to the heat source-side controller 12, and is provided inside the heat source unit 2. The heat source-side correspondence unit 11 is electrically connected with usage-side correspondence units 18a, 18b (described hereinafter) provided along with each of the usage-side controllers 19a, 19b inside the usage units 4a, 4b. The heat source-side correspondence unit 11 can receive various information and various data pertaining to the operating state and control of the heat pump system 1 from the usage-side correspondence units 18a, 18b, and the heat source-side correspondence unit 11 can also transmit the information and data to the usage-side correspondence units 18a, 18b.

Particularly, the heat source-side correspondence unit 11 receives second target evaporation temperatures Tte2a, Tte2b from each of the usage-side correspondence units 18a, 18b, these temperatures being calculated respectively by the usage-side controllers 19a, 19b in each of the usage units 4a, 4b.

The second target evaporation temperatures Tte2a, Tte2b referred to here are evaporation temperatures Te whereby the temperatures Tw1a, Tw1b of the aqueous medium in the outlets of each of the usage-side heat exchangers 41a, 41b will reach predetermined set temperatures Tsa, Tsb when each of the usage units 4a, 4b are performing the air-cooling operation (i.e., the aqueous medium cooling operation). For example, the set temperatures Tsa, Tsb of the aqueous medium in the outlets of the usage-side heat exchangers 41a, 41b, i.e., the temperature of the cooling water required to be used in the water usage cooling/warming units 9a, 9b is set to "7° C." in the usage unit 4a and "5° C." in the usage unit 4b. in this case, for the temperatures Tw1a, Tw1b of the aqueous medium in the respective outlets of the usage-side heat exchangers 41a, 41b to reach the corresponding set temperatures Tsa, Tsb (specifically, 7° C. and 5° C.), data indicating the appropriate necessary temperatures of the evaporation temperatures Te of the refrigerant in each of the usage-side heat exchangers 41a, 41b is received by the heat source-side correspondence unit 11 as the above-described "second target evaporation temperatures Tte2a, Tte2b" of each of the usage units 4a, 4b.

For the action of receiving the second target evaporation temperatures Tte2a, Tte2b, there is no restriction placed on the timing at which the heat source-side correspondence unit 11 may receive the second target evaporation temperatures Tte2a, Tte2b, For example, when the second target evaporation temperatures Tte2a, Tte2b are recalculated due to the set temperatures Tsa, Tsb being changed, the heat source-side correspondence unit 11 may receive the second target evaporation temperatures Tte2a, Tte2b from the corresponding usage units 4a, 4b after they have been newly calculated. The heat source-side correspondence unit 11 may also receive the second target evaporation temperatures Tte2a, Tte2b from all of the usage units 4a, 4b in the heat pump system 1 at established time intervals, such as every hour, for example.

The heat source-side correspondence unit 11 may also transmit a first target evaporation temperature Tte1 decided by the usage-side controllers 19a, 19b to each of the usage-side correspondence units 18a, 18b. The first target evaporation temperature Tte1 is described below in the section "—Heat Source-Side Controller—."

—Heat Source-Side Controller—

Figure 2:
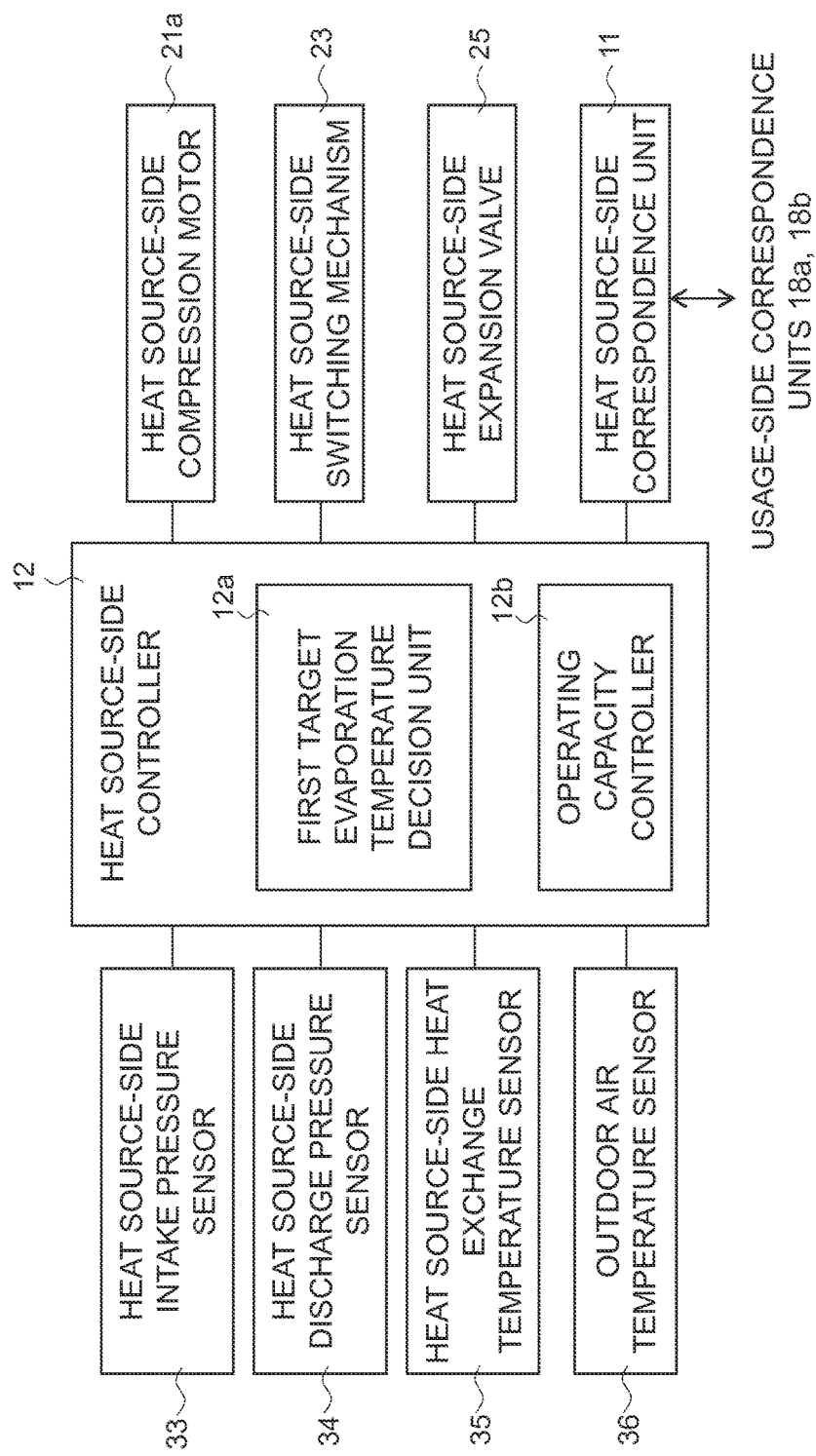
FIG. 2 is a diagram schematically depicting the heat source-side controller according to the present embodiment and the various sensors and various devices connected to this controller.

The heat source-side controller 12 is configured from a microcomputer composed of a CPU and memory, and is provided inside the heat source unit 2. The heat source-side controller 12 is connected with the heat source-side compression motor 21a, the heat source-side switching mechanism 23, the heat source-side expansion valve 25, and the various sensors 33 to 36 of the heat source unit 2, as shown in FIG. 2. The heat source-side controller 12 controls the rotational speed of the heat source-side compression motor 21a, the state switching of the heat source-side switching mechanism 23, the opening degree of the heat source-side expansion valve 25, and other factors on the basis of the detection results of the various sensor 33 to 36.

Particularly, the heat source-side controller 12 according to the present embodiment determines the first target evaporation temperature Tte1 and controls the operating capacity of the heat source-side compressor 21 based on the first target evaporation temperature Tte1. To perform such control the heat source-side controller 12 primarily functions as a first target evaporation temperature decision unit 12a (equivalent to part of a temperature decision unit) and an operating capacity controller 12b.

—First Target Evaporation Temperature Decision Unit—

The first target evaporation temperature decision unit 12a extracts a minimum value from the second target evaporation temperatures Tte2a, Tte2b calculated respectively by the usage-side controllers 19a, 19b of each of the usage units 4a, 4b, and decides this minimum value as the first target evaporation temperature Tte1. That is, the first target evaporation temperature decision unit 12a makes the lowest second target evaporation temperature the first target evaporation temperature Tte1 from among the plurality of second target evaporation temperatures Tte2a, Tte2b decided based on the set temperatures Tsa, Tsb of each of the usage units 4a, 4b.

—Operating Capacity Controller—

The operating capacity controller 12b controls the operating capacity of the heat source-side compressor 21 by controlling the rotational speed (i.e., the operating frequency) of the heat source-side compression motor 21a so that the evaporation temperature Te of the refrigerant in each of the usage-side heat exchangers 41a, 41b reaches the first target evaporation temperature Tte1. That is, in a system 1 in which the set temperatures Tsa, Tsb of the cooling water in each of the usage units 4a, 4b differ with each of the usage units 4a, 4b, the operating capacity controller 12b controls the operating capacity of the heat source-side compressor 21 on the basis of the lowest second target evaporation temperature (i.e., the first target evaporation temperature Tte1) among the evaporation temperatures Te (i.e., the second target evaporation temperatures Tte2a, Tte2b) required in all of the usage-side heat exchangers 41a, 41b in the system 1 in order to output aqueous media having the set temperatures Tsa, Tsb to the water usage cooling/warming units 9a, 9b.

—Usage-Side Correspondence Units—

The usage-side correspondence units 18a, 18b are electrically connected to the usage-side controllers 19a, 19b respectively, and are provided inside the usage units 4a, 4b. The usage-side correspondence units 18a, 18b are electrically connected with the heat source-side correspondence unit 11 provided along with the heat source-side controller 12 inside the heat source unit 2. The usage-side correspondence units 18a, 18b can receive various information and various data pertaining to the operating state and control of the heat pump system 1 from the heat source-side correspondence unit 11, and can also transmit the information and the data to the heat source-side correspondence unit 11.

Particularly, the usage-side correspondence units 18a, 18b transmit the second target evaporation temperatures Tte2a, Tte2b calculated respectively by the usage-side controllers 19a, 19b to the heat source-side correspondence unit 11. The usage-side correspondence units 18a, 18b also receive from the heat source-side correspondence unit 11 the first target evaporation temperature Tte1. decided by the heat source-side controller 12 functioning as the first target evaporation temperature decision unit 12a.

For the action of transmitting the second target evaporation temperatures Tte2a, Tte2b, the usage-side correspondence units 18a, 18b may transmit the second target evaporation temperatures Tte2a, Tte2b when the temperatures have been recalculated by the usage-side controllers 19a, 19b, and may transmit the second target evaporation temperatures Tte2a, Tte2b at established time intervals, such as every hour, for example.

—Usage-Side Controllers—

Figure 3:
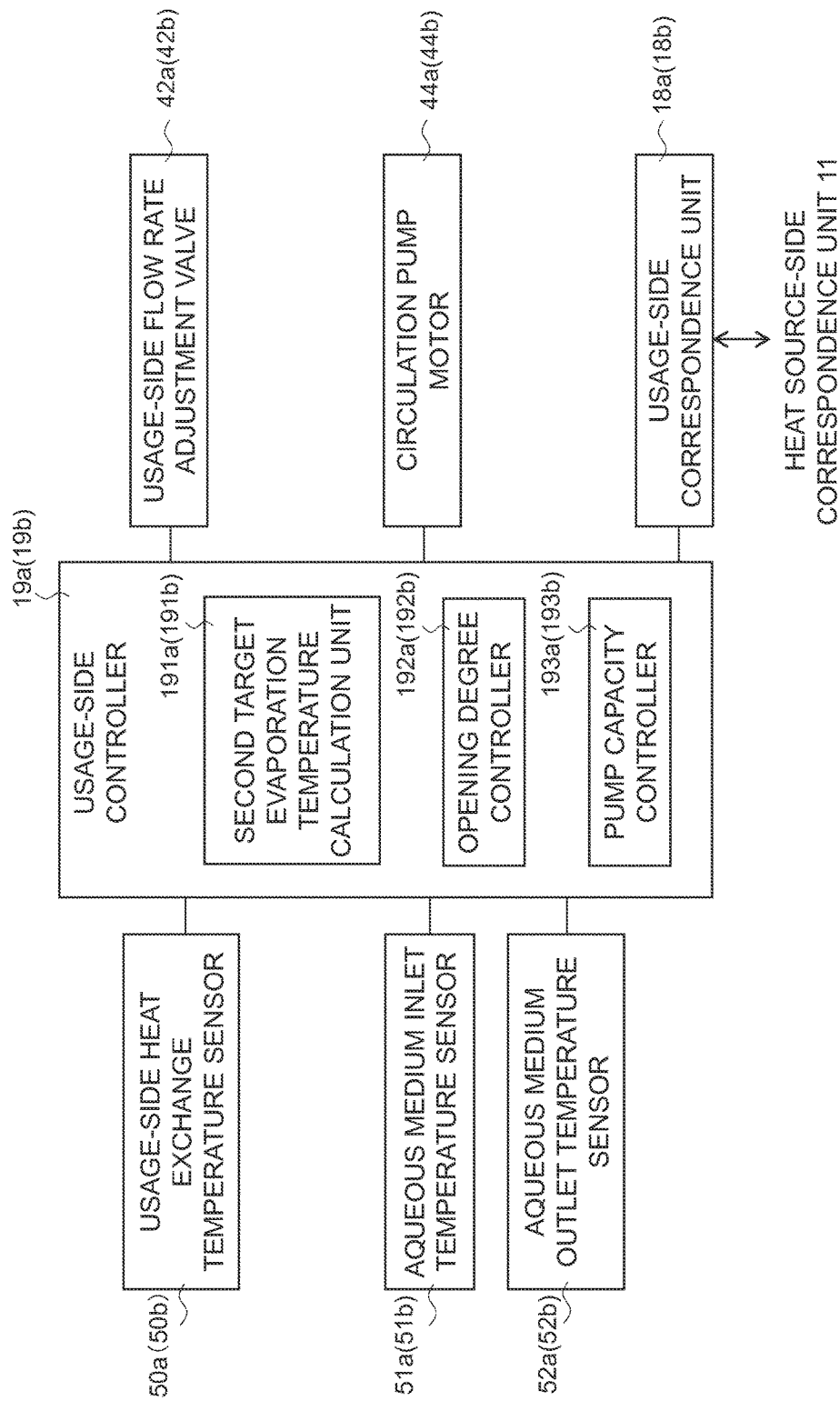
FIG. 3 is a diagram schematically depicting the usage-side controllers according to the present embodiment and the various sensors and various devices connected to these controllers.

The usage-side controllers 19a, 19b are each configured from a microcomputer composed of a CPU and memory, and are provided inside each of the usage units 4a, 4b. Each of the usage-side controllers 19a, 19b are connected with the usage-side flow rate adjustment valves 42a, 42b, the circulation pump motors 44a, 44b, and the various sensors 50a, 51a, 52a, 50b, 51b, 52b as shown in FIG. 3. Each of the usage-side controllers 19a, 19b control the various connected devices on the basis of the detection results of the various sensors 50a, 51a, 52a, 50b, 51b, 52b, the various information pertaining to the operating state and control of the heat pump system 1 sent from the heat source-side correspondence unit 11, and other factors. Specifically, the usage-side controllers 19a, 19b perform refrigerant flow rate control on the heat source-side refrigerant by controlling the opening degrees of the usage-side flow rate adjustment valves 42a, 42b, and flow rate control on the circulation pumps 43a, 43b by controlling the rotational speeds of the circulation pump motors 44a, 44b.

Particularly, when the usage units 4a, 4b are performing the air-cooling operation (i.e., the aqueous medium cooling operation), each of the usage-side controllers 19a, 19b according to the present embodiment calculate the second target evaporation temperatures Tte2a, Tte2b, and based on the second target evaporation temperatures Tte2a, Tte2b, the set temperatures Tsa, Tsb of the aqueous medium, and other factors, control the opening degrees of the usage-side flow rate adjustment valves 42a, 42b and control the capacities of the circulation pumps 43a, 43b. To perform such control, the usage-side controllers 19a, 19b primarily function as second target evaporation temperature calculation units 191a, 191b (equivalent to part of the temperature decision unit), opening degree controllers 192a, 192b, and pump capacity controllers 193a, 193b.

In FIG. 3, the usage-side controller 19b, its surrounding devices, and the like are denoted by symbols in parentheses so as to distinguish between the usage-side controller 19a and the surrounding devices associated with the usage unit 4a, and the usage-side controller 19b and the surrounding devices associated with the usage unit 4b.

—Second Target Evaporation Temperature Calculation Units—

When the usage units 4a, 4b are both performing the air-cooling operation, i.e. the aqueous medium cooling operation, the second target evaporation temperature calculation units 191a, 191b calculate the evaporation temperatures Te (i.e., the second target evaporation temperatures Tte2a, Tte2b) whereby the outlet temperatures Tw1a, Tw1b of the aqueous medium in the outlets of each of the usage-side heat exchangers 41a, 41b reach the predetermined set temperatures Tsa, Tsb. Specifically, based on the set temperatures Tsa. Tsb of the respective usage units 4a, 4b and the various information of the heat source-side refrigerant (e.g., the type of refrigerant, characteristics, and the like), each of the second target evaporation temperature calculation units 191a, 191b calculate the evaporation temperatures Te needed for the temperatures of the aqueous medium (i.e. the cooling water) supplied from the usage-side heat exchangers 41a, 41b to the water usage cooling/warming units 9a, 9b to reach the set temperatures Tsa, Tsb of the respective usage units 4a, 4b. As a result, the temperatures Te are set to the second target evaporation temperatures Tte2a, Tte2b.

—Opening Degree Controllers—

As described above, in the heat source unit 2 according to the present embodiment, operating capacity control is performed on the heat source-side compressor 21 so as to conform to the minimum value (i.e., the first target evaporation temperature Tte1) among the respective second target evaporation temperatures Tte2a, Tte2b of the plurality of connected usage units 4a, 4b. However, in this case, since the second target evaporation temperature Tte2b calculated in another usage unit 4b is lower than the second target evaporation temperature Tte2a calculated in the usage unit 4a, for example, when the second target evaporation temperature Tte2b calculated in the usage unit 4b is decided as the first target evaporation temperature Tte1, the refrigerant that flows in the usage unit 4a has been controlled based on the first target evaporation temperature Tte1 (i.e., the second target evaporation temperature Tte2b calculated in the usage unit 4b) which is lower than the second target evaporation temperature Tte2a calculated for the usage unit 4a itself. The actual evaporation temperature Te of the usage-side heat exchanger 41a in the usage unit 4a then becomes lower than the second target evaporation temperature Tte2a calculated in the respective usage unit 4a (for example, the actual evaporation temperature Te becomes the first target evaporation temperature Tte1), and as a result, there is a risk that the temperature Tw1a of the aqueous medium in the outlet of the usage-side heat exchanger 41a will be equal to or less than the set temperature Tsa of the aqueous medium in the usage unit 4a.

In view of this, when the current evaporation temperature Te is less than the second target evaporation temperatures Tte2a, Tte2b calculated in the respective usage units 4a, 4b (Te<Tte2a, Tte2b) and the temperatures Tw1a, Tw1b of the aqueous medium in the outlets of the usage-side heat exchangers 41a, 41b are less than the predetermined set temperatures Tsa, Tsb in the respective usage units 4a, 4b (Tw1a<Tsa, Tw1b<Tsb), each of the opening degree controllers 192a, 192b vary the opening degrees of the usage-side flow rate adjustment valves 42a, 42b in the respective usage units 4a, 4b. Specifically, when the evaporation temperature Te is less than the second target evaporation temperatures Tte2a, Tte2b (Te<Tte2a, Tte2b) and the temperatures Tw1a, Tw1b of the aqueous medium (i.e., the cooling water) in the outlets of the usage-side heat exchangers 41a, 41b are less than the (predetermined set temperatures Tsa, Tsb (Tw1a<Tsa, Tw1b<Tsb), each of the opening degree controllers 192a, 192b perform a control for reducing the opening degrees of the usage-side flow rate adjustment valves 42a, 42b, whereby the temperatures Tw1a, Tw1b of the aqueous medium in the outlets of the usage-side heat exchangers 41a, 41b reach the predetermined set temperatures Tsa, Tsb. That is, the opening degree controllers 192a, 192b lower the heat exchange capability between the heat source-side refrigerant and the aqueous medium in the usage-side heat exchangers 41a, 41b and raise the temperatures of the aqueous medium outputted from the outlets of the usage-side heat exchangers 41a, 41b by reducing the flow rates of the refrigerant flowing inside the usage-side heat exchangers 41a, 41b. For example, when evaporator outlet superheating degree constant control is performed on the usage-side heat exchangers 41a, 41b functioning as evaporators during the air-cooling operation (i.e., the aqueous medium cooling operation), the opening degree controllers 192a, 192b in the usage units 4a, 4b cause the second target evaporation temperatures Tte2a, Tte2b calculated in the usage units 4a, 4b itself to shift upward. As a result of this control, an aqueous medium of the optimum temperature is supplied from each of the usage units 4a, 4b to the water usage cooling/warming units 9a, 9b.

—Pump Capacity Controllers—

Each of the pump capacity controllers 193a, 193b control the operating capacities of the circulation pumps 43a, 43b so that the outlet/inlet temperature differences ΔTwa, ΔTwb, which are the differences between the temperatures Tw1a, Tw1b of the aqueous medium in the outlets of the usage-side heat exchangers 41a, 41b of the respective usage units 4a, 4b and the temperatures Twra, Twrb of the aqueous medium in the inlets, reach predetermined temperature differences ΔTwsa, ΔTwsb. Specifically each of the pump capacity controllers 193a, 193b determine the differences between the detection results of the aqueous medium inlet temperature sensors 51a, 51b and the detection results of the aqueous medium outlet temperature sensors 52a, 52b to be the out(et/inlet temperature differences ΔTwa, ΔTwb (ΔTwa=Twra−Tw1a, ΔTwb=Twrb−Twit)), and control the rotational speeds (i.e. the operating frequencies) of each of the circulation pump motors 44a, 44b so that the determined outlet/inlet temperature differences ΔTwa, ΔTwb reach the predetermined temperature differences ΔTwsa, ΔTwsb, thereby controlling the operating capacities of each of the circulation pumps 43a, 43b and adjusting the flow rates in the aqueous medium circuits 80a, 80b. For example, when the outlet/inlet temperature differences ΔTwa, ΔTwb are greater than the predetermined temperature differences ΔTwsa, ΔTwsb, the pump capacity controllers 193a, 193b determine that the flow rate of the aqueous medium circulating through the aqueous medium circuits 80a, 80b is low and increase the rotational speeds (i.e. the operating frequencies) of the circulation pump motors 44a, 44b, thereby increasing the operating capacities of the circulation pumps 43a, 43b. Conversely, when the outlet/inlet temperature differences ΔTwa, ΔTwb are less than the predetermined temperature differences ΔTwsa, ΔTwsb, the pump capacity controllers 193a, 193b determine that the flow rate of the aqueous medium circulating through the aqueous medium circuits 80a, 80b is high and reduce the rotational speeds (i.e. the operating frequencies) of the circulation pump motors 44a, 44b, thereby reducing the operating capacities of the circulation pumps 43a, 43b.

The predetermined temperature differences ΔTwsa, ΔTwsb herein are suitably set by calculations on the desk, simulations, experiments, or another method on the basis of the set temperatures Tsa, Tsb of the aqueous medium, the capabilities of the circulation pumps 43a, 43b, the various information of the heat source-side refrigerant (e.g., the type of refrigerant, characteristics, and the like), and other factors, for example.

When the respective usage units 4a, 4b are performing the air-cooling operation (i.e., the aqueous medium cooling operation), the current evaporation temperature Te is lower than the second target evaporation temperatures Tte2a, Tte2b calculated in the respective usage units 4a, 4b (Te<Tte2a, Tte2b), and the temperatures Tw1a, Tw1b of the aqueous medium in the outlets of the usage-side heat exchangers 41a, 41b are less than the predetermined set temperatures Tsa, Tsb in the respective usage units 4a, 4b (Tw1a<Tsa, Tw1b<Tsb); each of the pump capacity controllers 193a, 193b perform a control for varying the operating capacities of the circulation pumps 43a, 43b in the respective usage units 4a, 4b. Specifically, when the evaporation temperature Te is lower than the second target evaporation temperatures Tte2a, Tte2b (Te<Tte2a, Tte2b) and the temperatures Tw1a, Tw1b of the aqueous medium (i.e. the cooling water) in the outlets of the usage-side heat exchangers 41a, 41b are less than the predetermined set temperatures Tsa, Tsb (Tw1a<Tsa, Tw1b<Tsb), each of the pump capacity controllers 193a, 193b control the operating capacities of the circulation pumps 43a, 43b an that the temperatures of the aqueous medium in the inlets of the usage-side heat exchangers 41a, 41b (specifically, the detection results of the aqueous medium inlet temperature sensors 51a, 51b) reach values obtained by subtracting the predetermined temperature differences ΔTwsa, ΔTwsb from the predetermined set temperatures Tsa, Tsb (Twra=Tsa−ΔTwsa, Twfb=Tsb−ΔTwsb). The operating capacities of the circulation pumps 43a, 43b are controlled herein so as to decrease.

Particularly, in the present embodiment, the operating capacity control of the above-mentioned circulation pumps 43a, 43b is performed after opening degree control of the usage-side flow rate adjustment valves 42a, 42b has been performed by the opening degree controllers 192a, 192b as previously described, and is performed when the temperatures Tw1a, Tw1b of the aqueous medium in the outlets of the usage-side heat exchangers 41a, 41b are less than the predetermined set temperatures Tsa, Tsb (Tw1a<Tsa, Tw1b<Tsb), in order for the evaporation temperature Te to be less than the second target evaporation temperatures Tte2a, Tte2b (Te<Tte2a, Tte2b). That is, even if the flow rate of the heat source-side refrigerant is reduced by the opening degree control of the usage-side flow rate adjustment valves 42a, 42b, in cases in which there has not yet been a resolution of the temperatures Tw1a, Tw1b of the aqueous medium in the outlets of the usage-side heat exchangers 41a, 41b being equal to or less than the set temperatures Tsa, Tsb of the aqueous medium in the respective usage units 4a, 4b, the circulation rates of the aqueous medium in the aqueous medium circuits 80a, 80b is controlled by varying the operating capacities of the circulation pumps 43a, 43b. This is because there is a limit to increasing the temperature of the aqueous medium in the opening degree control of the usage-side flow rate adjustment valves 42a, 42b, and the operating capacities of the circulation pumps 43a, 43b are therefore controlled in order to compensate accordingly. When the degree of superheating is too great, refrigerating machine oil accumulates in the usage-side heat exchangers 41a, 41b functioning as evaporators, and there is a risk that the refrigerating machine oil will not be returned to the side of the heat source unit 2. Therefore, in the heat pump system 1 according to the present embodiment, the operating capacities of the circulation pumps 43a, 43b are controlled in order to ensure that the system 1 is reliable. When the flow rate of the heat source-side refrigerant is reduced by the opening degree control of the usage-side flow rate adjustment valves 42a, 42b, control can be performed for reducing the capabilities of the circulation pumps 43a, 43b because of the outlet/inlet temperature differences ΔTwa, ΔTwb in the side of the aqueous medium in the usage-side heat exchangers 41a, 41b.

<Action>

Next, the action of the heat pump system 1 wilt be described. The hot-water supply operation, the air-warming operation, and the air-cooling operation are examples of the types of operations of the heat pump system 1.

—Hot-water Supply Operation and Air-Warming Operation—

During either the hot-water supply operation or the air-warming operation, in the heat source-side refrigerant circuit 20, the heat source-side switching mechanism 23 is switched to the heat source-side evaporating operation state (the state shown by the dashed lines of the heat source-side switching mechanism 23 in FIG. 1), and the intake return expansion valve 26a is closed. The heat source-side heat exchanger 24 functions as an evaporator and each of the usage-side heat exchangers 41a, 41b function as radiators.

In the heat source-side refrigerant circuit 20 in such a state, the heat source-side refrigerant of a constant pressure in the refrigeration cycle is drawn through the heat source-side intake tube 21c into the heat source-side compressor 21, compressed to a high pressure in the refrigeration cycle, and then discharged to the heat source-side discharge tube 21b. The high-pressure heat source-side refrigerant discharged to the heat source-side discharge tube 21b has the refrigerating machine oil separated in the oil separator 22a. The refrigerating machine oil separated from the heat source-side refrigerant in the oil separator 22a is returned to the heat source-side intake tube 21c through the oil return tube 22b. The high-pressure heat source-side refrigerant from which the refrigerating machine oil has been separated is sent through the heat source-side switching mechanism 23, the second heat source-side gas refrigerant tube 23b, and the gas-side shut-off valve 30 to the as refrigerant communication tube 14 from the heat source unit 2.

The high-pressure heat source-side refrigerant sent to the gas refrigerant communication tube 14 is sent to each of the usage units 4a, 4b. The high-pressure heat source-side refrigerant sent to each of the usage units 4a, 4b is sent to each of the usage-side heat exchangers 41a, 41b via each of the usage-side refrigerant tubes 46a, 46b. The high-pressure heat source-side refrigerant sent to each of the usage-side heat exchangers 41a, 41b radiates heat in each of the usage-side heat exchangers 41a, 41b by heat exchange with the aqueous medium circulating through the aqueous medium circuits 80a, 80b respectively. Having radiated heat in each of the usage-side heat exchangers 41a, 41b, the high-pressure heat source-side refrigerant is sent from each of the usage units 4*a*, 4*b* to the liquid refrigerant communication tube 13 through the usage-side flow rate adjustment valves 42*a*, 42*b* and the usage-side refrigerant tubes 45*a*, 45*b*.

The heat source-side refrigerant sent to the liquid refrigerant communication tube 13 is sent to the heat source unit 2. The heat source-side refrigerant sent to the heat source unit 2 is sent through the liquid-side shut-off valve 29 to the supercooler 27. The heat source-side refrigerant sent to the supercooler 27 is sent to the heat source-side expansion valve 25 without undergoing heat exchange in the supercooler 27 because the heat source-side refrigerant does not flow to the intake return tube 26 (that is, the intake return expansion valve 26*a* is closed). The heat source-side refrigerant sent to the heat source-side expansion valve 25 is depressurized in the heat source-side expansion valve 25 into a gas-liquid two-phase state at constant pressure, and is then sent through the heat source-side liquid refrigerant tube 24*a* to the heat source-side heat exchanger 24. The low-pressure refrigerant sent to the heat source-side heat exchanger 24 is evaporated in the heat source-side heat exchanger 24 by heat exchange with outdoor air supplied by the heat source-side fan 32. The low-pressure heat source-side refrigerant evaporated in the heat source-side heat exchanger 24 is sent through the first heat source-side gas refrigerant tube 23*a* and the heat source-side switching mechanism 23 to the heat source-side accumulator 28. The low-pressure heat source-side refrigerant sent to the heat source-side accumulator 28 is again drawn into the heat source-side compressor 21 through the heat source-side intake tube 21*c*.

In both the hot-water supply operation and the air-warming operation, the aqueous medium heating operation is performed in each of the aqueous medium circuits 80*a*, 80*b*. That is, the aqueous medium circulating through both the aqueous medium circuits 80*a*, 80*b* is heated by the heat radiation of the heat source-side refrigerant in each of the usage-side heat exchangers 41*a*, 41*b*. The aqueous medium (i.e. hot water) heated in each of the usage-side heat exchangers 41*a*, 41*b* is drawn into each of the circulation pumps 43*a*, 43*b* via the respective usage-side water outlet tubes 48*a*, 48*b* and increased in pressure.

During the hot-water supply operation, each of the aqueous medium switching mechanisms 161*a*, 161*b* are switched to a state in which the aqueous medium is not supplied to the water usage cooling/warming units 9*a*, 9*b* but the aqueous medium is supplied only to the side of each of the hot-water storage units 8*a*, 8*b*. Therefore, during the hot-water supply operation, the aqueous medium (i.e. hot water) increased in pressure by each of the circulation pumps 43*a*, 43*b* is sent from each of the usage units 4*a*, 4*b* to each of the hot-water storage units 8*a*, 8*b* via the respective aqueous medium communication tubes 16*a*, 16*b*. The aqueous medium sent to each of the hot-water storage units 8*a*, 8*b* radiates heat in each of the heat exchange coils 82*a*, 82*b* by heat exchange with the aqueous medium in the hot-water storage tanks 81*a*, 81*b*. The aqueous medium in each of the hot-water storage tanks 81*a*, 81*b* is thereby heated.

During the air-warming operation, each of the aqueous medium switching mechanisms 161*a*, 161*b* are switched to a state in which the aqueous medium is supplied either to the hot-water storage units 8*a*, 8*b* and the water usage cooling/warming units 9*a*, 9*b*, or only to the water usage cooling/warming units 9*a*, 9*b*. Therefore, during the air-warming operation, the aqueous medium (i.e. hot water) increased in pressure by each of the circulation pumps 43*a*, 43*b* is sent from the usage units 4*a*, 4*b* via the aqueous medium communication tubes 16*a*, 16*b* respectively either to the hot-water storage units 8*a*, 8*b* and the water usage cooling/warming units 9*a*, 9*b*, or only to the water usage cooling/warming units 9*a*, 9*b*. The aqueous medium (i.e. hot water) sent to each of the hot-water storage units 8*a*, 8*b* radiates heat in each of the heat exchange coils 82*a*, 82*b* by heat exchange with the aqueous medium in the hot-water storage tanks 81*a*, 81*b*. The aqueous medium in each of the hot-water storage tanks 81*a*, 81*b* is thereby heated. The aqueous medium sent to each of the water usage cooling/warming units 9*a*, 9*b* also radiates heat in the respective heat exchange panels 91*a*, 91*b*. The wall of the room or the floor of the room is thereby heated.

—Air-Cooling Operation—

In this case, in the heat source-side refrigerant circuit 20, the heat source-side switching mechanism 2.3 is switched to the heat source-side heat radiating operation state (the state shown by the solid lines of the heat source-side switching mechanism 23 in FIG. 1), and the intake return expansion valve 26*a* is opened. The heat source-side heat exchanger 24 functions as a radiator, and each of the usage-side heat exchangers 41*a*, 41*b* function as evaporators.

In the heat source-side refrigerant circuit 20 in such a state, the low-pressure heat source-side refrigerant in the refrigeration cycle is drawn into the heat source-side compressor 21 through the heat source-side intake tube 21*c* and compressed to a high pressure in the refrigeration cycle, and is then discharged to the heat source-side discharge tube 21*b*. The high-pressure heat source-side refrigerant discharged to the heat source-side discharge tube 21*b* is separated from the refrigerating machine oil in the oil separator 22*a*. The refrigerating machine oil separated from the heat source-side refrigerant in the oil separator 22*a* is returned to the heat source-side intake tube 21*c* through the oil return tube 22*b*. The high-pressure heat source-side refrigerant from which the refrigerating machine oil has been separated is sent through the heat source-side switching mechanism 23 and the first heat source-side gas refrigerant tube 23*a* to the heat source-side heat exchanger 24. The high-pressure heat source-side refrigerant sent to the heat source-side heat exchanger 24 radiates heat in the heat source-side heat exchanger 24 by heat exchange with the outside air supplied by the heat source-side fan 32. The high-pressure heat source-side refrigerant that has radiated heat in the heat source-side heat exchanger is sent through the heat source-side expansion valve 25 to the supercooler 27. The heat source-side refrigerant sent to the supercooler 27 is cooled to a supercooled state by heat exchange with the heat source-side refrigerant branched off from the heat source-side liquid refrigerant tube 24*a* to the intake return tube 26. The heat source-side refrigerant flowing through the intake return tube 26 is returned to the heat source-side intake tube 21*c*. The heat source-side refrigerant cooled in the supercooler 27 is sent from the heat source unit 2 to the liquid refrigerant communication tube 13 through the heat source-side liquid refrigerant tube 24*a* and the liquid-side shut-off valve 29.

The high-pressure heat source-side refrigerant sent from the heat source unit 2 to the liquid refrigerant communication tube 13 is sent to each of the usage units 4*a*, 4*b*. The high-pressure heat source-side refrigerant sent to each of the usage units 4*a*, 4*b* is sent to each of the usage-side flow rate adjustment valves 42*a*, 42*b* via the respective usage-side refrigerant tubes 45*a*, 45*b*. In the usage-side flow rate adjustment valves 42*a*, 42*b*, the high-pressure heat source-side refrigerant is depressurized to a low-pressure gas-liquid two-phase state, and is sent to each of the usage-side heat exchangers 41a, 41b. The low-pressure heat source-side refrigerant sent to each of the usage-side heat exchangers 41a, 41b is evaporated by heat exchange with the aqueous medium circulating through the respective aqueous medium circuits 80a, 80b. The low-pressure heat source-side refrigerant evaporated in each of the usage-side heat exchangers 41a, 41b is sent to the gas refrigerant communication tube 14 through the respective usage-side refrigerant tubes 46a, 46b.

The heat source-side refrigerant sent to the gas refrigerant communication tube 14 is sent to the heat source unit 2. The heat source-side refrigerant sent to the heat source unit 2 is sent through the gas-side shut-off valve 30, the second heat source-side gas refrigerant tube 23b, and the heat source-side switching mechanism 23 to the heat source-side accumulator 28. The low-pressure heat source-side refrigerant sent to the heat source-side accumulator 28 is again drawn into the heat source-side compressor 21 through the heat source-side intake tube 21c.

In each of the aqueous medium circuits 80a, 80b, the aqueous medium cooling operation is performed. Specifically, the aqueous medium circulating through the respective aqueous medium circuits 80a, 80b is cooled by the evaporation of the heat source-side refrigerant in each of the usage-side heat exchangers 41a, 41b. The aqueous medium (i.e. cooling water) cooled in each of the usage-side heat exchangers 41a, 41b is drawn into each of the circulation pumps 43a, 43b via the respective usage-side water outlet tubes 48a, 48b and is increased in pressure.

During the air-cooling operation, each of the aqueous medium switching mechanisms it 161a, 161b are switched to a state in which the aqueous medium is not supplied to the side of each of the hot-water storage units 8a, 8b, but the aqueous medium is supplied only to each of the water usage cooling/warming units 9a, 9b. Therefore, during the air-cooling operation, the aqueous medium (i.e., cooling water) increased in pressure by each of the circulation pumps 43a, 43b is sent from each of the usage units 4a, 4b to each of the water usage cooling/warming units 9a, 9b via the aqueous medium communication tubes 16a, 16b, respectively. The aqueous medium (i.e. cooling water) sent to each of the water usage cooling/warming units 9a, 9b absorbs heat in the respective heat exchange panels 91a, 91b. The wall of the room or the floor of the room is thereby cooled.

—Flow of Overall Action of Heat Pump System 1—

Figure 4:
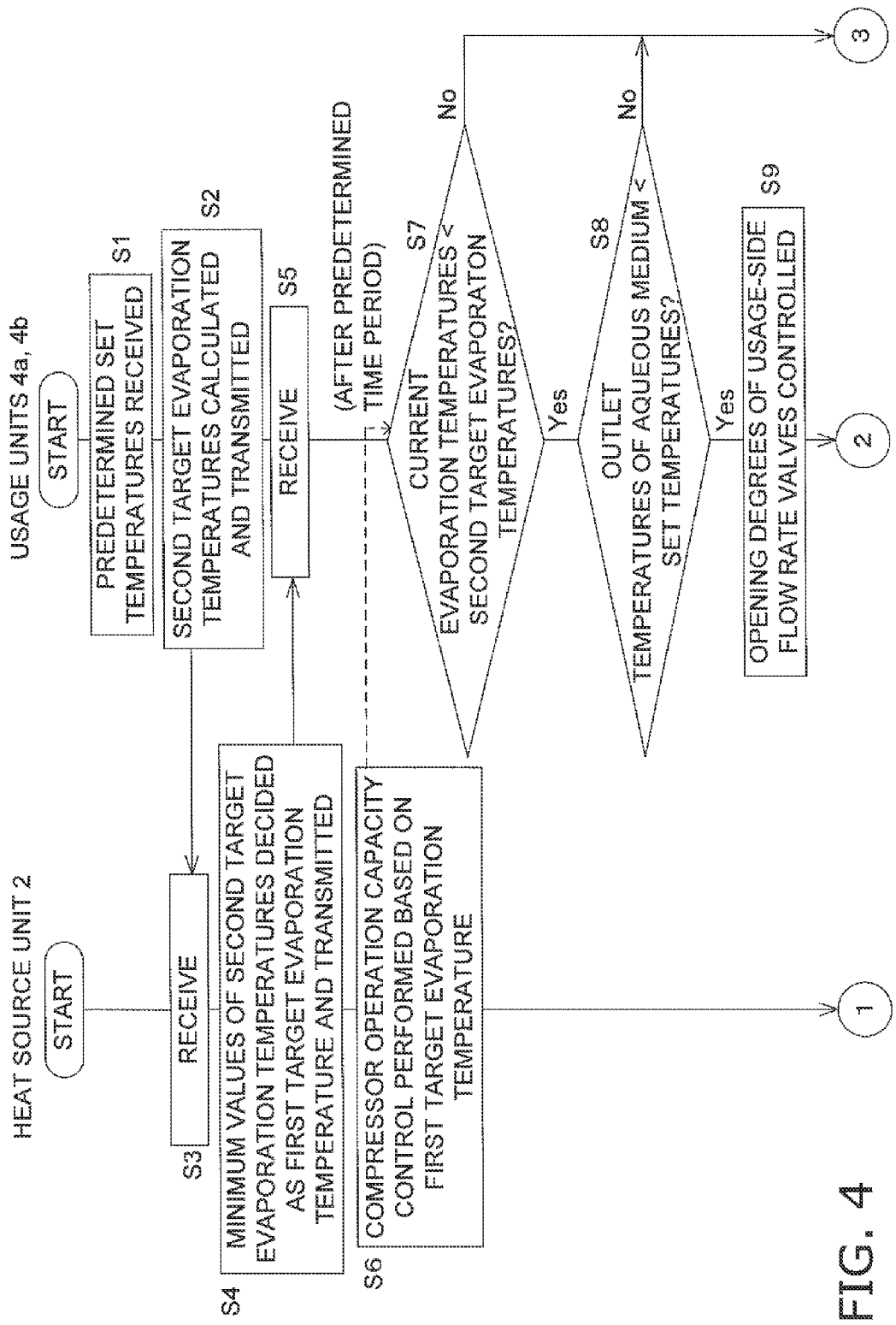
FIG. 4 is a flowchart showing the flow of the overall action of the system when the heat pump system according to the present embodiment is performing the air-cooling operation.
Figure 5:
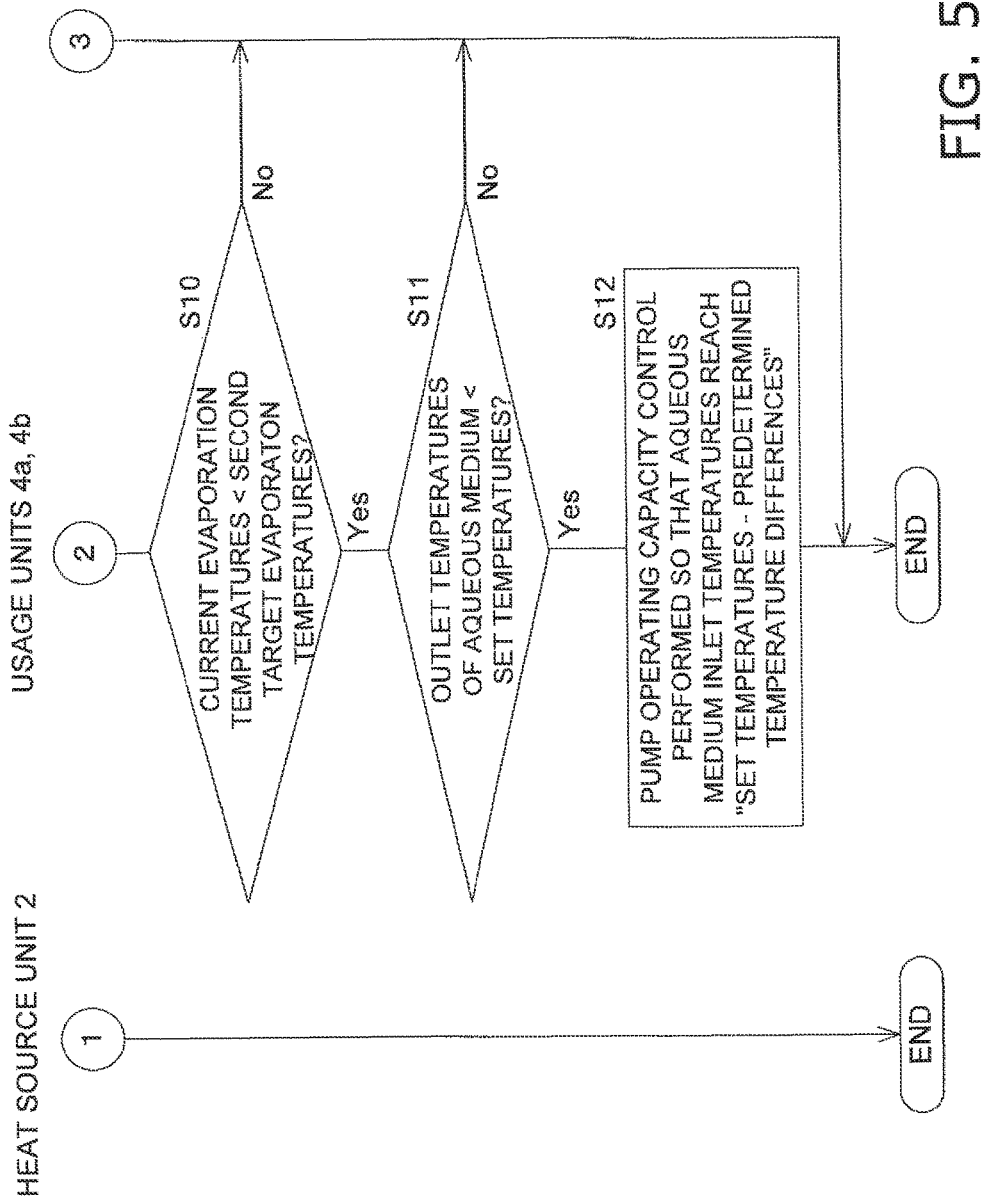
FIG. 5 is a flowchart showing the flow of the overall action of the system when the heat pump system according to the present embodiment is performing the air-cooling operation.

FIGS. 4 and 5 are flowcharts showing the flow of the overall action of the system 1 when the heat pump system 1 according to the present embodiment is performing the air-cooling operation. Hereinbelow, the opening degrees of the usage-side flow rate adjustment valves 42a, 42b are "open" to begin with, and operating capacity control is performed so that the operating capacities of the circulation pumps 43a, 43b reach a predetermined capacity.

Steps S1 to S3: The set temperatures Tsa, Tsb of the aqueous medium in each of the usage units 4a, 4b are inputted by a user or the like via a remote controller (not shown) or the like (S1). In this case, the usage-side controllers 19a, 19b functioning as the second target evaporation temperature calculation units 191a, 191b in each of the usage units 4a, 4b calculate the second target evaporation temperatures Tte2a, Tte2b in the respective usage units 4a, 4b. In other words, the usage-side controllers 19a, 19b calculate the evaporation temperatures Te whereby the temperatures of the aqueous medium in the outlets of each of the usage-side heat exchangers 41a, 41b will reach the predetermined set temperatures Tsa, Tsb, and designate these temperatures as the second target evaporation temperatures Tte2a, Tte2b (S2). The usage-side correspondence units 18a, 18b of each of the usage units 4a, 4b then transmit the second target evaporation temperatures Tte2a, Tte2b which are the calculation results to the heat source unit 2 (S4), and the heat source-side correspondence unit 11 of the heat source unit 2 receives this transmission (S3).

Steps S4 to S5: In the heat source unit 2, the heat source-side controller 12. functioning as the first target evaporation temperature decision unit 12a decides, as the first target evaporation temperature Tte1, the minimum value from between the second target evaporation temperatures Tte2a, Tte2b calculated by each of the usage units 4a, 4b (S4). The heat source-side correspondence unit 11 transmits the decided first target evaporation temperature Tte1 to each of the usage units 4a, 4b (S4), and the usage-side correspondence units 18a, 18b of each of the usage units 4a, 4b receive this transmission (S5).

Step S6: in the heat source unit 2, the heat source-side controller 12 functioning as the operating capacity controller 12b controls the operating capacity of the heat source-side compressor 21 so that the evaporation temperatures Te of the refrigerant in each of the usage-side heat exchangers 41a, 41b reach the first target evaporation temperature Tte1 decided in step S4.

Steps S7 to S9: After a predetermined amount of time has elapsed following the control according to step S6 (such as 10 minutes, for example), in each of the usage units 4a, 4b, the usage-side controllers 19a, 19b functioning as the opening degree controllers 192a, 192b compare the evaporation temperatures Te with the second target evaporation temperatures Tte2a, Tte2b, and also compare the temperatures Tw1a, Tw1b of the aqueous medium (i.e. cooling water) in the outlets of the usage-side heat exchangers 41a, 41b with the set temperatures Tsa, Tsb in the respective usage units 4a, 4b. When the evaporation temperatures Te are lower than the second target evaporation temperatures Tte2a, Tte2b (Yes in S7, Te<Tte2a, Tte2b) and the temperatures Tw1a, Tw1b of the aqueous medium (i.e. cooling water) in the outlets of the usage-side heat exchangers 41a, 41b are less than the set temperatures Tsa, Tsb (Yes in S8, Tw1a<Tsa, Tw1b<Tsb), the usage-side controllers 19a, 19b perform a control for reducing the opening degrees of the usage-side flow rate adjustment valves 42a, 42b, thereby controlling the temperatures Tw1a, Tw1b of the aqueous medium in the outlets of the usage-side heat exchangers 41a, 41b so that they reach the predetermined set temperatures Tsa, Tsb (S9).

In step S7, when the evaporation temperatures Te are equal to or greater than the second target evaporation temperatures Tte2a, Tte2b (No in S7, Te≥Tte2a, Tte2b), and in step S8, when the temperatures Tw1a, Tw1b of the aqueous medium (i.e. cooling water) in the outlets of the usage-side heat exchangers 41a, 41b are equal to or greater than the predetermined set temperatures Tsa, Tsb (No in S8, Tw1a≥Tsa, Tw1b≥Tsb), the control currently being performed on the heat source unit 2 and the usage units 4a, 4b continues to be performed.

Particularly, in step S8, in cases in which the temperatures Tw1a, Tw1b of the aqueous medium (i.e. cooling water) in the outlets of the usage-side heat exchangers 41a, 41b have continued for several seconds to be greater than the predetermined set temperatures Tsa, Tsb (No in S8, Tw1a>Tsa, Tw1b>Tsb), operating capacity control is performed on the circulation pumps 43a, 43b by the usage-side controllers 19a, 19b functioning as the pump capacity controllers 193a, 193b so that the outlet/inlet temperature differences $\Delta$Twa, $\Delta$Twb reach the predetermined temperature differences $\Delta$Twsa, $\Delta$Twsb.

Steps S10 to S12: After the control according to step S9 has been performed for a predetermined amount of time (such as 10 minutes, for example), in each of the usage units 4a, 4b, the usage-side controllers 19a, 9b functioning as the pump capacity controllers 193a, 193b again compare the evaporation temperatures Te with the second target evaporation temperatures Tte2a, Tte2b and also compare the temperatures Tw1a, Tw1b of the aqueous medium (i.e. cooling water) in the outlets of the usage-side heat exchangers 41a, 41b with the set temperatures Tsa, Tsb in the respective usage units 4a, 4b, When the evaporation temperatures Te are still less than the second target evaporation temperatures Tte2a, Tte2b (Yes in S10, Te<Tte2a, Tte2b) and the temperatures Tw1a, Tw1b of the aqueous medium (i.e. cooling water) in the outlets of the usage-side heat exchangers 41a, 41b are still less than the predetermined set temperatures Tsa, Tsb (Yes in S11, Tw1a<Tsa, Tw1b<Tsb), the usage-side controllers 19a, 19b perform operating capacity control on the circulation pumps 43a, 43b (S12.) so that the temperatures Twra, Twrb of the aqueous medium in the inlets of the usage-side heat exchangers 41a, 41b reach the values obtained by subtracting the predetermined temperature differences $\Delta$Twsa, $\Delta$Twsb from the predetermined set temperatures Tsa, Tsb (Twra=Tsa−$\Delta$Twsa, Twrb=Tsb−$\Delta$Twsb). Specifically, the operating capacities of the circulation pumps 43a, 43b are controlled so as to decrease.

In step S10, when the evaporation temperatures Te are equal to or greater than the second target evaporation temperatures Tte2a, Tte2b (No in S10, Te≥Tte2a, Tte2b), and in step S11, when the temperatures Tw1a, Tw1b of the aqueous medium (i.e. cooling water) in the outlets of the usage-side heat exchangers 41a, 41b are equal to or greater than the predetermined set temperatures Tsa, Tsb (No in S1, Tw1a>Tsa, Tw1b>Tsb), the operating capacity control of the heat source-side compressor 21 is performed, which is currently being performed in the heat source unit 2, and the opening degree control of step S9 currently being performed continues to be performed in the usage units 4a, 4b.

In the control of step S9, the targets of control by the usage-side controllers 19a, 19b were the outlet temperatures Tw1a, Tw1b of the usage-side heat exchangers 41a, 41b, but from the control of step S12, it can be said that the target of control by the usage-side controllers 19a, 19b is shifted from the outlet temperatures Tw1a, Tw1b to the inlet temperatures Twra, Twrb.

<Characteristics>

The heat pump system 1 has the following characteristics.

(1)

In the heat pump system 1, when the air-cooling operation is being performed, the minimum value between the second target evaporation temperatures Tte2a, Tte2b, which allow the temperatures Tw1a, Tw1b of each of the aqueous medium in the outlets of the usage-side heat exchangers 41a, 41b of the usage units 4a, 4b to reach the predetermined set temperatures Tsa, Tsb, is decided as the first target evaporation temperature Tte1. The operating capacity control of the heat source-side compressor 21 is then performed so that the evaporation temperatures Te of the refrigerant in each of the usage-side heat exchangers 41a, 41b reach this first target evaporation temperature Tte1. Thereby, in the heat pump system 1 in which a plurality of usage units 4a, 4b having different set temperatures Tsa, Tsb of the aqueous medium are connected to a single heat source, an aqueous medium of the optimal temperature is supplied to each of the usage units 4a, 4b. Therefore, unnecessary inefficiency can be prevented, because it is possible to achieve a system wherein water of separate temperatures can be used without using a method in which operation constantly takes place at the minimum water temperature of the aqueous medium predicted among all the usage units 4a, 4b.

The operating capacity control of the heat source-side compressor 21 is performed according to the values of the set temperatures Tsa, Tsb so that the evaporation temperatures Te of the refrigerant in each of the usage-side heat exchangers 411a, 41b reach the first target evaporation temperature Tte1, whereby the temperatures Tw1a, Tw1b of the aqueous medium in the outlets of the usage-side heat exchangers 41a, 41b can reach the predetermined set temperatures Tsa, Tsb. in this case, there is no need for a bypass valve or the like, which had been necessary in cases of using the method in which operation constantly takes place at the minimum water temperature of the aqueous medium, and the cost of the heat pump system 1 can therefore be reduced.

(2)

When the operating capacity control of the heat source-side compressor 21 of the heat source unit 2 is performed based on the minimum value (i.e. the first target evaporation temperature Tte1) between the respective second target evaporation temperatures Tte2a, Tte2b of the plurality of usage units 4a, 4b, there is a risk, depending on the usage units 4a, 4b, that the evaporation temperatures Te will be less than the corresponding second target evaporation temperatures Tte2a, Tte2b (Te<Tte2a, Tte2b) and the outlet temperatures Tw1a, Tw1b of the aqueous medium in the usage-side heat exchangers 41a, 41b will be less than the predetermined set temperatures Tsa, Tsb. However, in this heat pump system 1, when the evaporation temperatures Te are less than the second target evaporation temperatures Tte2a, Tte2b (Te<Tte2a, Tte2b) and the temperatures Tw1a, Tw1b of the aqueous medium in the outlets of the usage-side heat exchangers 41a, 41b are less than the predetermined set temperatures Tsa, Tsb (Tw1a<Tsa, Tw1b<Tsb), control is performed for varying the opening degrees of the usage-side flow rate adjustment valves 42a, 42b. Thereby, the flow rates of the heat source-side refrigerant flowing within the usage-side heat exchangers 41a, 41b can be controlled, and the temperatures of the aqueous medium outputted from each of the usage units 4a, 4b can be adjusted.

(3)

Specifically, when the evaporation temperatures Te are less than the second target evaporation temperatures Tte2a, Tte2b (Te<Tte2a, Tte2b) and the temperatures Tw1a, Tw1b of the aqueous medium in the outlets of the usage-side heat exchangers 41a, 41b are less than the predetermined set temperatures Tsa, Tsb (Tw1a<Tsa, Tw1b<Tsb), the opening degrees of the usage-side flow rate adjustment valves 42a, 42b are reduced. The flow rates of the refrigerant flowing within the usage-side heat exchangers 41a, 41b are thereby reduced, and the heat exchange capabilities between the refrigerant and the aqueous medium in the usage-side heat exchangers 41a, 41b decrease compared to before the opening degrees of the usage-side flow rate adjustment valves 42a, 42b were reduced. Consequently, after the aqueous medium has undergone heat exchange in the usage-side heat exchangers 41a, 41b, the temperatures of the aqueous medium increase compared to before the opening degrees of the usage-side flow rate adjustment valves 42a, 42b were reduced. Therefore, the temperatures of the aqueous medium outputted from each of the usage units 4a, 4b are optimized.

(4)

In this heat pump system 1, when the evaporation temperatures Te in the usage units 4a, 4b are less than the second target evaporation temperatures Tte2a, Tte2b (Te<Tte2a, Tte2b) and the outlet temperatures Tw1a, Tw1b of the aqueous medium in the usage-side heat exchangers 41a, 41b are less than the predetermined set temperatures Tsa, Tsb (Tw1a<Tsa, Tw1b<Tsb), control is performed for varying the operating capacities of the circulation pumps 43a, 43b. Thereby, the flow rates of the aqueous medium circulating within the aqueous medium circuits 80a, 80b can be controlled, and the temperatures of the aqueous medium outputted from each of the usage units 4a, 4b can be adjusted.

(5)

Specifically, when the evaporation temperatures Te in the usage units 4a, 4b are less than the second target evaporation temperatures Tte2a, Tte2b (Te<Tte2a, Tte2b) and the outlet temperatures Tw1a, Tw1b of the aqueous medium in the usage-side heat exchangers 41a, 41b are less than the predetermined set temperatures Tsa, Tsb (Tw1a<Tsa, Tw1b<Tsb), the operating capacities of the circulation pumps 43a, 43b are controlled so that the respective aqueous medium inlet temperatures Twra, Twrb of the usage-side heat exchangers 41a, 41b reach the values obtained by subtracting the predetermined temperature differences ΔTwsa, ΔTwsb from the predetermined set temperatures Tsa, Tsb. The outlet temperatures Tw1a, Tw1b of the aqueous medium in the usage-side heat exchangers 41a, 41b can thereby be controlled to temperatures obtained by adding the predetermined temperature differences ΔTwsa, ΔTwsb to the inlet temperatures Twra, Twrb, i.e., the predetermined set temperatures Tsa, Tsb. Therefore, the temperatures of the aqueous medium outputted from each of the usage units 4a, 4b are optimized.

(6)

Particularly, in this heat pump system 1, when the evaporation temperatures Te in the usage units 4a, 4b are less than the second target evaporation temperatures Tte2a, Tte2b (Te<Tte2a, Tte2b) and the outlet temperatures Tw1a, Tw1b of the aqueous medium in the usage-side heat exchangers 41a, 41b are less than the predetermined set temperatures Tsa, Tsb (Tw1a<Tsa, Tw1b<Tsb), first, opening degree control of the usage-side flow rate adjustment valves 42a, 42b is performed. Since the evaporation temperatures Te are then still less than the second target evaporation temperatures Tte2a, Tte2b (Te<Tte2a, Tte2b) even when the opening degree control is performed, control is performed for varying the operating capacities of the circulation pumps 43a, 43b in cases in which the outlet temperatures Tw1a, Tw1b of the aqueous medium in the usage-side heat exchangers 41a, 41b have not reached the predetermined set temperatures Tsa, Tsb. In other words, first, the flow rates of the refrigerant flowing through the usage-side heat exchangers 41a, 41b are adjusted, and when, despite this, the outlet temperatures Tw1a, Tw1b of the aqueous medium do not reach the predetermined set temperatures Tsa, Tsb, the flow rates of the aqueous medium circulating within the aqueous medium circuits 80a, 80b are adjusted. The temperatures of the aqueous medium outputted from each of the usage units 4a, 4b can thereby be reliably optimized.

<Modifications of Heat Pump System 1 According to Present Embodiment>

(A)

With the heat pump system 1 described above, a case was described in which the second target evaporation temperatures Tte2a, Tte2b were calculated in the side having each of the usage units 4a, 4b and the first target evaporation temperature Pei was calculated in the side having the heat source unit 2. However, the second target evaporation temperatures Tte2a, Tte2b of the individual usage units 4a, 4b may be calculated in the side having the heat source unit 2 in the same manner as the first target evaporation temperature Tte1.

Figure 6:
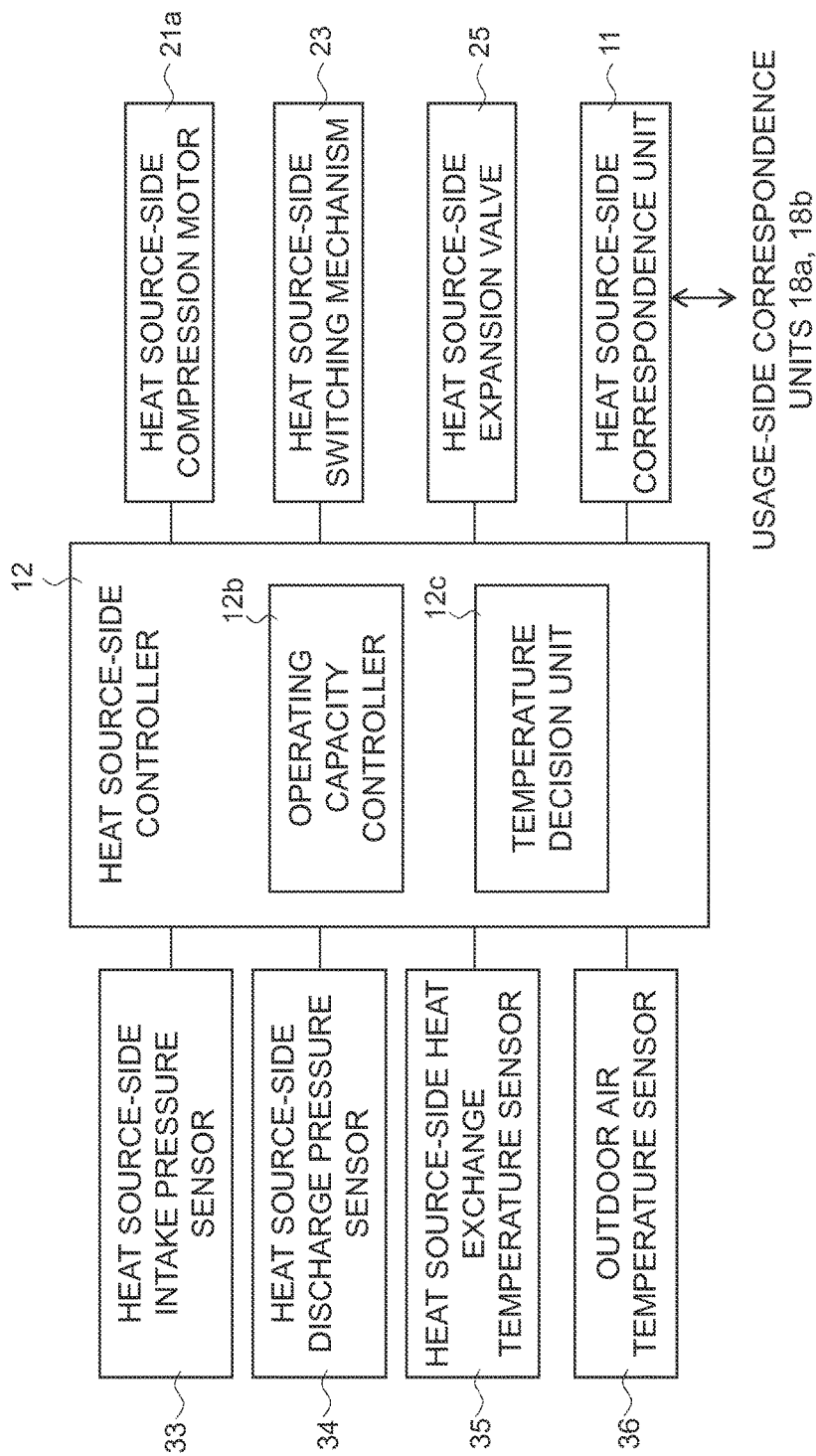
FIG. 6 is a diagram schematically depicting the at source-side controller according to Modification 1 and the various sensors and various devices connected to this controller.
Figure 7:
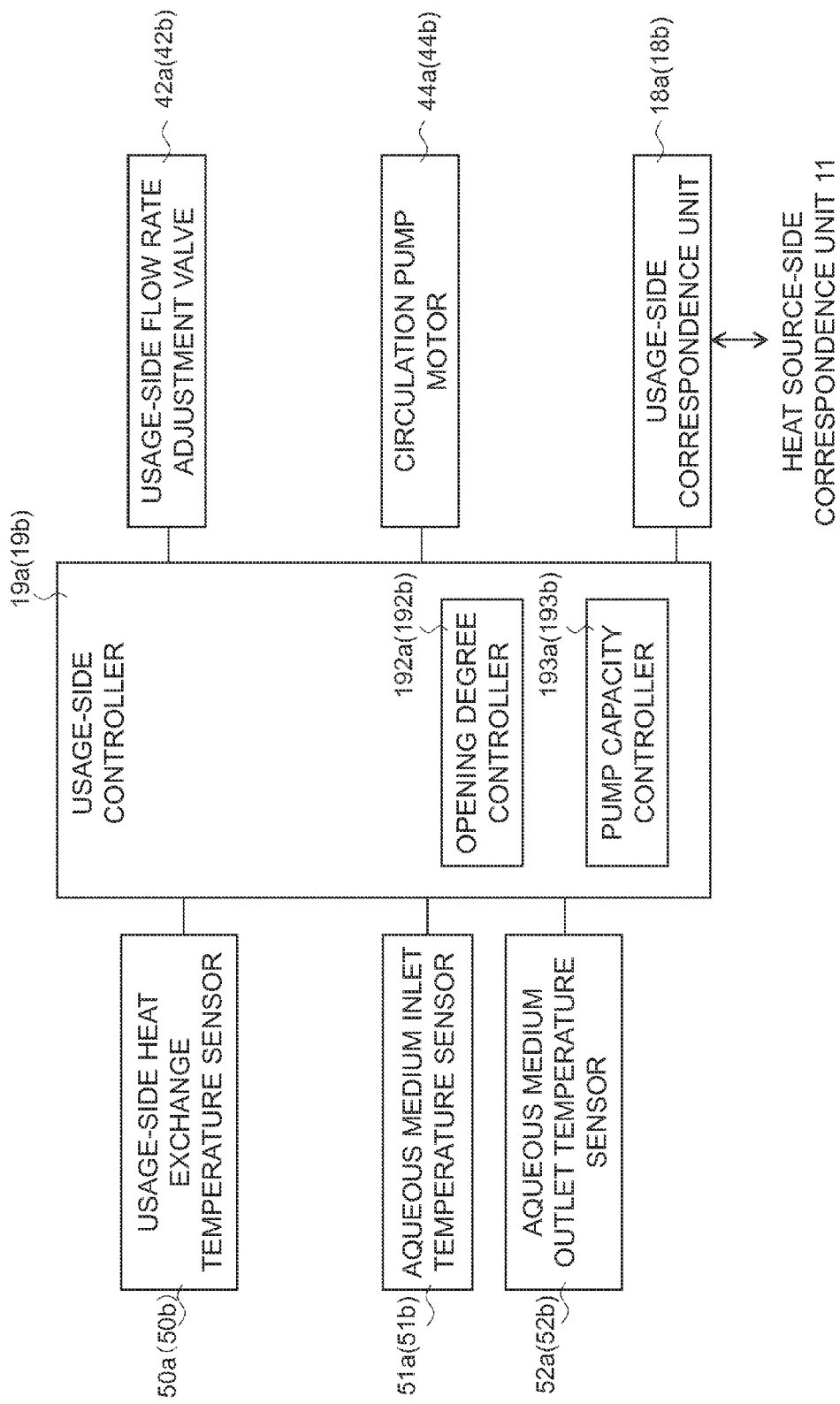
FIG. 7 is a diagram schematically depicting the usage-side controllers according to Modification 1 and the various sensors and various devices connected to these controllers.

FIG. 6 shows a schematic diagram of the heat source-side controller 12 of this case and its surrounding devices, and FIG. 7 shows a schematic diagram of the usage-side controllers 19a, 19b and their surrounding devices. In this case, instead of functioning as the first target evaporation temperature decision unit 12a of FIG. 2 described above, the heat source-side controller 12 can function as a temperature decision unit 12c for calculating the second target evaporation temperatures Tte2a, Tte2b of the individual usage units 4a, 4b and deciding the first target evaporation temperature Tte1, as shown in FIG. 6. The usage-side controllers 19a, 19b can also function as the opening degree controllers 192a, 192b and the pump capacity controllers 193a, 193b as shown in FIG. 7, without functioning as the second target evaporation temperature calculation units 191a, 191b shown in FIG. 3.

When the second target evaporation temperatures Tte2a, Tte2b of the individual usage units 4a, 4b are calculated in the side having the heat source unit 2, each of the set temperatures Tsa, Tsb, the opening degree states of each of the usage-side flow rate adjustment valves 42a, 42b, and other data are sent from each of the usage units 4a, 4b to the heat source unit 2 as the data needed in order to calculate the second target evaporation temperatures Tte2a, Tte2b of the usage units 4a, 4b.

In FIGS. 6 and 7, the connecting configuration and other characteristics of the heat source-side controller 12 and the usage-side controllers 19a, 19b are the same as the connecting configuration and other characteristics of the heat source-side controller 12 and the usage-side controllers 19a, 19b according to FIGS. 2 and 3. Therefore, in FIGS. 6 and 7, other configuration aside from the "temperature decision unit 12c" uses the same symbols as FIGS. 2 and 3, and a detailed description thereof is omitted.

(B)

Figure 8:
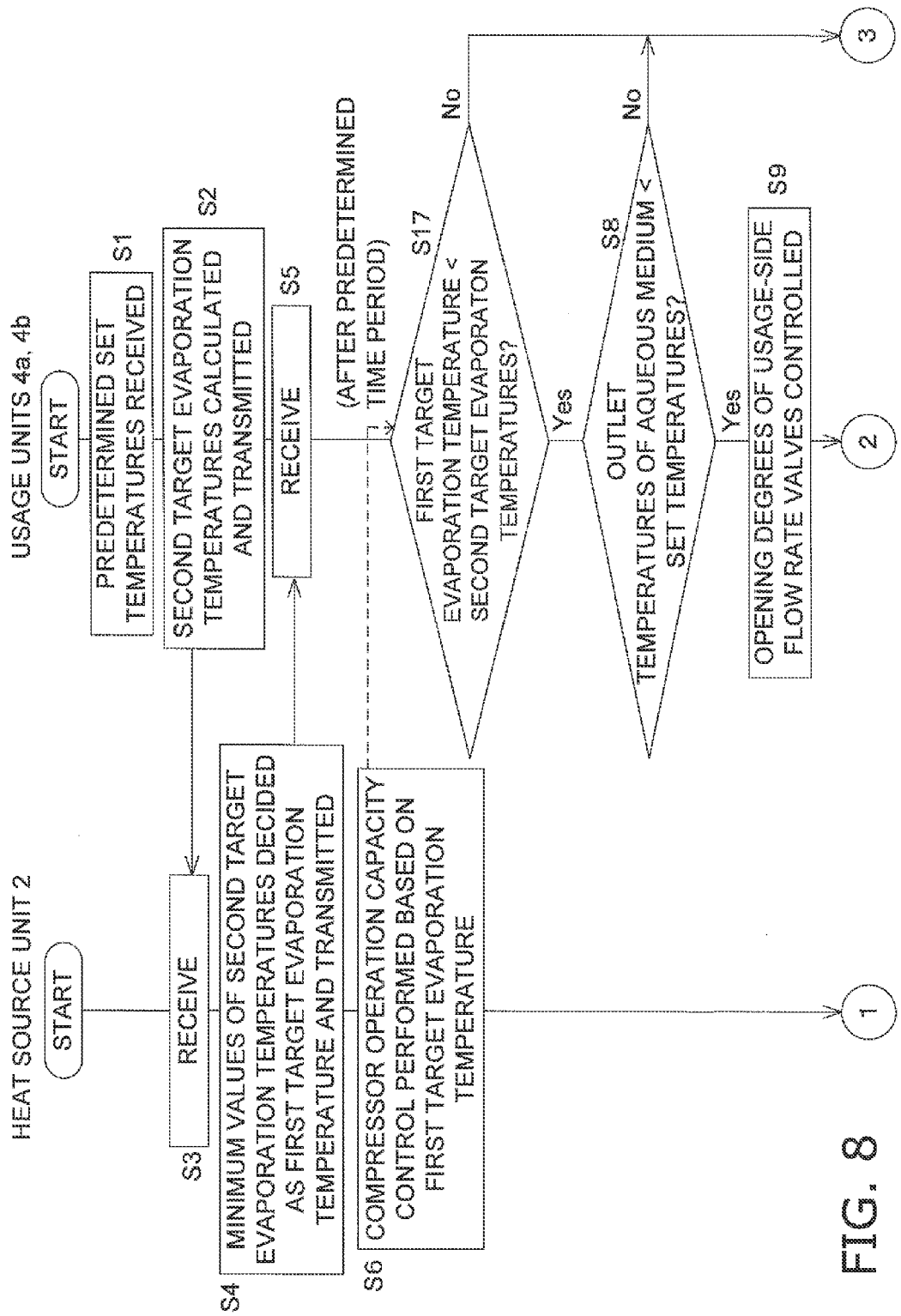
FIG. 8 is a flowchart showing the flow of the overall action of the system when the heat pump system according to Modification 2 is performing the air-cooling operation.
Figure 9:
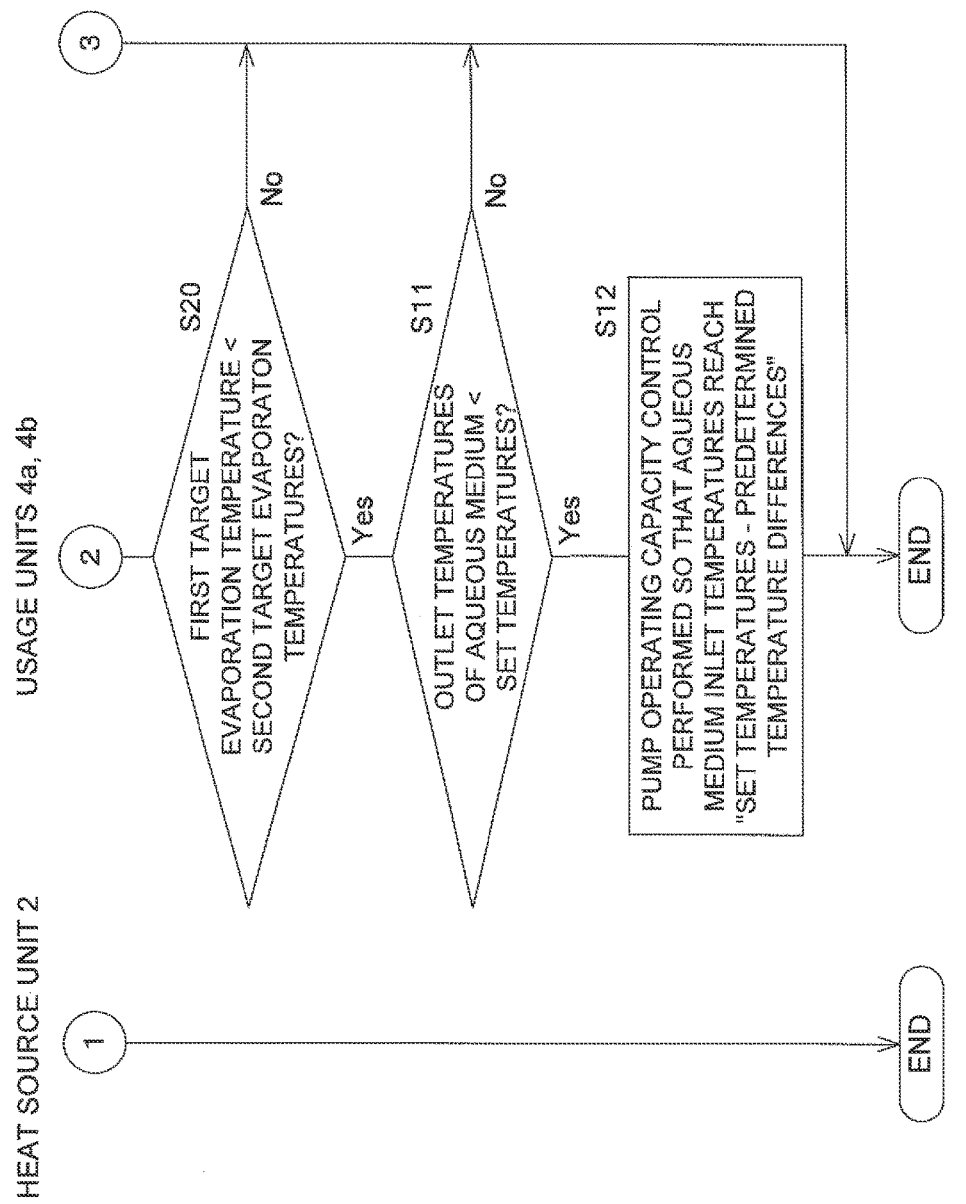
FIG. 9 is a flowchart showing the flow of the overall action of the system when the heat pump system according to Modification 2 is performing the air-cooling operation.

In the heat pump system 1 described above, the description stated that the evaporation temperatures Te and the second target evaporation temperatures Tte2a, Tte2b were compared in the opening degree control of the usage-side flow rate adjustment valves 42a, 42b and the capacity control of the circulation pumps 43a, 43b (step S7 of FIG. 4, step S10 of FIG. 5), However, in the heat pump system according to the present invention, the first target evaporation temperature Tte1 and the second target evaporation temperatures Tte2a, Tte2b may be compared under the conditions of implementing the opening degree control of the usage-side flow rate adjustment valves 42a, 42b and the capacity control of the circulation pumps 43a, 43b, as in step S17 of FIG. 8 and step S20 of FIG. 9. In other words, when the first target evaporation temperature Tte1 is lower than the second target evaporation temperatures Tte2a, Tte2b (Tte1<Tte2a, Tte2b), and the outlet temperatures Tw1a, Tw1b of the aqueous medium in the usage-side heat exchangers 41a, 41b are less than the predetermined set temperatures Tsa, Tsb (Tw1a<Tsa, Tw1b<Tsb), the opening degree control of the usage-side flow rate adjustment valves 42a, 42b is performed and the capacity control of the circulation pumps 43a, 43b is performed. The reason for this is because the operating capacity of the heat source-side compressor 21 is controlled based on the minimum value between the second target evaporation temperatures Tte2a, Tte2b of each of the usage units 4a, 4b, and the evaporation temperatures Te of the heat source-side refrigerant in the usage-side heat exchangers 41a, 41b will therefore eventually reach the first target evaporation temperature Tte1 which is equal to or less than the second target evaporation temperatures Tte2a, Tte2b. Therefore, rather than comparing the evaporation temperatures Te and the second target evaporation temperatures Tte2a, Tte2b, the first target evaporation temperature Tte1 and the second target evaporation temperatures Tte2a, Tte2b may be compared.

FIGS. 8 and 9 show the overall action flow during the air-cooling operation of the heat pump system 1 according to the present modification. In FIGS. 8 and 9, aside from steps S17 and S20, the other steps have the same step numbers as FIGS. 4 and 5. Therefore, a detailed description of FIGS. 8 and 9 is omitted.

—Evaporator Superheating Degree Constant Control—

Though briefly mentioned above in the "opening degree controller," the evaporator superheating degree constant control may be performed in the opening degree control of the usage-side flow rate adjustment valves 42a, 42b relating to the action of the heat pump system 1 according to FIGS. 4 and 5 and FIGS. 8 and 9. Specifically, in steps S17 and S8 of FIGS. 8 and 9, for example, when the first target evaporation temperature Tte1 is less than the second target evaporation temperatures Tte2a, Tte2b and the outlet temperatures Tw1a, Tw1b of the aqueous medium are less than the predetermined set temperatures Tsa, Tsb (Yes in S17, Yes in S8 of FIG. 8), corrective control of the refrigerant flow rate, i.e. opening degree control of the usage-side flow rate adjustment valves 42a, 42b is performed by adding a correction value to the target value of the evaporation superheating degree and shilling the target value upward within a predetermined range. In step S17, if the first target evaporation temperature Tte1 is higher than the second target evaporation temperatures Tte2a, Tte2b (No in S17), the target value of the evaporation superheating degree is returned to the default value. In step S8, if the outlet temperatures Tw1a, Tw1b of the aqueous medium are higher than the predetermined set temperatures Tsa, Tsb (No in S8), corrective control of the refrigerant flow rate, i.e. opening degree control of the usage-side flow rate adjustment valves 42a, 42b is performed by subtracting a correction value from the target value of the evaporation superheating degree and shifting the target value downward within a predetermined range.

(C)

In the heat pump system 1 described above, a case was described wherein, when the temperatures Tw1a, Tw1b of the aqueous medium in the outlets of the usage-side heat exchangers 41a, 41b are less than the predetermined set temperatures Tsa, Tsb, opening degree control of the usage-side flow rate adjustment valves 42a, 42b is first performed, and operating capacity control of the circulation pumps 43a, 43b is then performed, as shown in FIGS. 4 and 5. However, the operating capacity control of the circulation pumps 43a, 43b may be performed first, and the opening degree control of the usage-side flow rate adjustment valves 42a, 42b may be performed afterward.

Other options are to perform only the opening degree control of the usage-side flow rate adjustment valves 42a, 42b, or to perform only the operating capacity control of the circulation pumps 43a, 43b.

(D)

There has been described above a heat pump system 1 that has a so-called one-dimensional refrigerant circuit, constituting the heat source-side refrigerant circuit 20 and the aqueous medium circuits 80a, 80b as shown in FIG. 1. However, the heat pump system according to the present invention may have a system configuration having a "two-dimensional" refrigerant circuit, such as that shown in FIG. 10.

Figure 10:
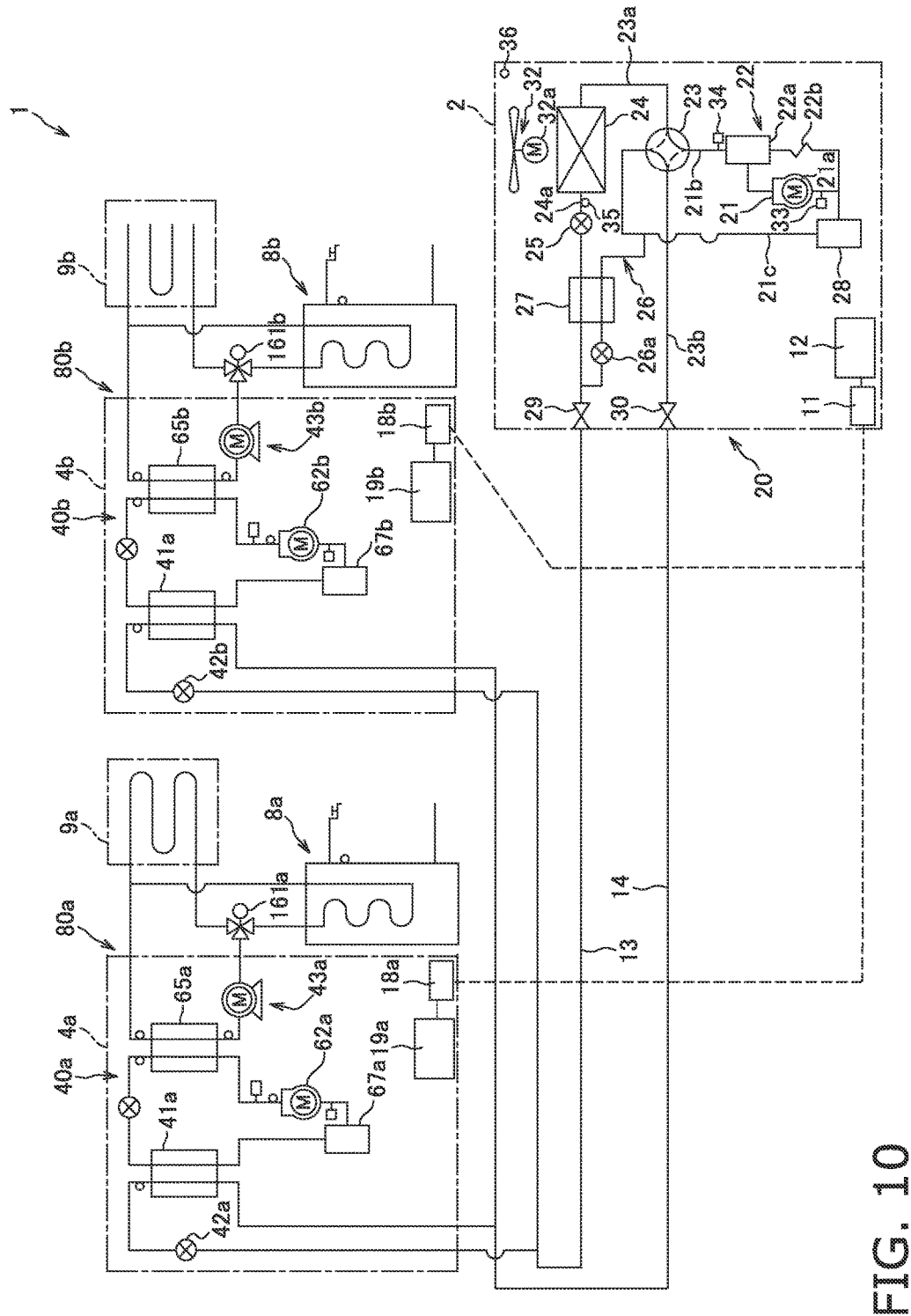
FIG. 10 is a schematic configuration view of the heat pump system according to Modification 4.

In the heat pump system 1 of FIG. 10, usage-side refrigerant circuits 40a, 40b are configured in addition to the heat source-side refrigerant circuit 20 and the aqueous medium circuits 80a, 80b. The usage-side refrigerant circuits 40a, 40b are configured within the respective usage units 4a, 4b, and are positioned between the heat source-side refrigerant circuit 20 and the aqueous medium circuits 80a, 80b. Each of the usage-side refrigerant circuits 40a, 40b are configured primarily from usage-side compressors 62a, 62b, usage-side accumulators 67a, 67b, usage-side heat exchangers 41a, 41b, and refrigerant-water heat exchangers 65a, 65b; and a usage-side refrigerant circulates inside the usage-side refrigerant circuits 40a, 40b. In this case, the usage-side heat exchangers 41a, 41b do not perform heat exchange between the heat source-side refrigerant and the aqueous medium but instead perform heat exchange between the heat source-side refrigerant and the usage-side refrigerant, and the refrigerant-water heat exchangers 65a, 65b perform heat exchange between the usage-side refrigerant and the aqueous medium.

With a system configuration such as the one in FIG. 10, during the hot-water supply operation and the air-warming operation, the usage-side heat exchangers 41a, 41b function as radiators of the heat source-side refrigerant and also as evaporators of the usage-side refrigerant, and the refrigerant-water heat exchangers 65a, 65b function as radiators of the usage-side refrigerant. Therefore, during the hot-water supply operation and the air-warming operation, an aqueous medium of a higher temperature than that of the system of FIG. 1 can be supplied from the usage units 4a, 4b to the hot-water storage units 8a, 8b and the water usage cooling/warming units 9a, 9b.

Aside from the usage-side refrigerant circuits 40a, 40b, the rest of the configuration of FIG. 10 is the same as the configuration of FIG. 1, and the same symbols as FIG. 1 are therefore used. Therefore, no detailed description is given of the rest of the configuration aside from the usage-side refrigerant circuits 40a, 40b relating to FIG. 10.

(E)

For the heat pump system 1 described above, a case was described in which usage units 4a, 4b that use an aqueous medium are connected to the heat source unit 2. However, the heat pump system according to the present invention may further comprise an air conditioner which uses a heat source-side refrigerant to condition air, in addition to the heat source unit 2 and the plurality of usage units 4a, 4b that use an aqueous medium. In this case, the air conditioner is connected to the heat source unit 2, similar to the usage units 4a, 4b.

(F)

For the heat pump system 1 described above, a case was described in which the usage-side flow rate adjustment valves 42a, 42b and the circulation pumps 43a, 43b are provided in the respective usage units 4a, 4b. However, since the flow rates of the refrigerant flowing in the usage-side heat exchangers 41a, 41b are preferably adjusted, the set positions of the flow rate adjustment valves for adjusting the flow rates of the refrigerant need not he inside the usage units 4a, 4b. Since the aqueous medium flowing in the aqueous medium circuits 80a, 80b is preferably circulated by circulation pumps, the set positions of the capacity-variable circulation pumps also need not be in the usage units 4a, 4b.

INDUSTRIAL APPLICABILITY

According to the present invention, it is possible to prevent inefficient operation from being performed unnecessarily in a heat pump system in which an aqueous medium can be cooled using a heat pump cycle.

What is claimed is:

1. A heat pump system comprising:
    a heat source unit having a capacity-variable compressor configured to compress refrigerant and a heat source-side heat exchanger configured to function as a radiator of refrigerant;
    a plurality of usage units connected to the heat source unit, the usage units having usage-side heat exchangers, respectively, the usage-side heat exchangers being configured to function as evaporators of refrigerant and to cool an aqueous medium;
    an operating capacity controller configured to perform operating capacity control on the compressor so that an evaporation temperature of refrigerant in each of the usage-side heat exchangers reaches a first target evaporation temperature;
    a temperature decision unit configured
        to calculate second target evaporation temperatures at which temperatures of the aqueous medium in outlets of the usage-side heat exchangers of the respective operating usage units reach predetermined set temperatures, respectively, and
        to set a minimum value of the second target evaporation temperatures as the first target evaporation temperature;
    a plurality of flow rate adjustment valves configured to vary flow rates of refrigerant flowing through the usage-side heat exchangers; and
    an opening degree controller configured to perform an opening degree control in which opening degrees of the flow rate adjustment valves are varied upon the evaporation temperatures being less than the second target evaporation temperatures and the temperatures of the aqueous medium in the outlets of the usage-side heat exchangers being less than the predetermined set temperatures.

2. The heat pump system according to claim 1, wherein the opening degree controller is further configured to perform a control in which the opening degrees of the flow rate adjustment valves are reduced upon the evaporation temperatures being less than the second target evaporation temperatures and the temperatures of the aqueous medium in the outlets of the usage-side heat exchangers being less than the predetermined set temperatures such that the temperatures of the aqueous medium in the outlets of the usage-side heat exchangers reach the predetermined set temperatures.

3. The heat pump system according to claim 2, further comprising:
    aqueous medium circuits having capacity-variable-type circulation pumps configured to circulate the aqueous medium that undergoes heat exchange with refrigerant in the usage-side heat exchangers; and
    a pump capacity controller configured to perform a control in which operating capacity of the circulation pumps are varied upon the evaporation temperatures being less than the second target evaporation temperatures and the temperatures of the aqueous medium in the outlets of the usage-side heat exchangers being less than the predetermined set temperatures.

4. The heat pump system according to claim 3, wherein the pump capacity controller is further configured
    to control the operating capacities of the circulation pumps so that an outlet/inlet temperature difference reaches a predetermined temperature difference, the outlet/inlet temperature difference being the difference between the temperatures of the aqueous medium in the outlets of the usage-side heat exchangers and the temperatures of the aqueous medium in inlets of the usage-side heat exchangers, and
    to perform a control in which the operating capacities of the circulation pumps are lowered so that the temperatures of the aqueous medium in the inlets of the usage-side heat exchangers reach a value obtained by subtracting the predetermined temperature difference from the predetermined set temperature upon the evaporation temperatures being less than the second target evaporation temperatures and the temperatures of the aqueous medium in the outlets of the usage-side heat exchangers being less than the predetermined set temperatures.

5. The heat pump system according to claim 3, wherein the pump capacity controller is further configured to perform a control in which the operating capacities of the circulation pumps are varied when the temperatures of the aqueous medium in the outlets of the usage-side heat exchangers are less than the predetermined set temperatures after the opening degree control has been performed on the flow rate adjustment valves by the opening degree controller.

6. The heat pump system according to claim 1, further comprising:
    aqueous medium circuits having capacity-variable-type circulation pumps configured to circulate the aqueous medium that undergoes heat exchange with refrigerant in the usage-side heat exchangers; and
    a pump capacity controller configured to perform a control in which operating capacity of the circulation pumps are varied when the evaporation temperatures are less than the second target evaporation temperatures and the temperatures of the aqueous medium in the outlets of the usage-side heat exchangers are less than the predetermined set temperatures.

7. The heat pump system according to claim 6, wherein the pump capacity controller is further configured
    to control the operating capacities of the circulation pumps so that an outlet/inlet temperature difference reaches a predetermined temperature difference, the outlet/inlet temperature difference being the difference between the temperatures of the aqueous medium in the outlets of the usage-side heat exchangers and the temperatures of the aqueous medium in inlets of the usage-side heat exchangers, and
    to perform a control in which the operating capacities of the circulation pumps are lowered so that the temperatures of the aqueous medium in the inlets of the usage-side heat exchangers reach a value obtained by subtracting the predetermined temperature difference from the predetermined set temperature when the evaporation temperatures are less than the second target evaporation temperatures and the temperatures of the aqueous medium in the outlets of the usage-side heat exchangers are less than the predetermined set temperatures.

8. The heat pump system according to claim 7, further comprising:

the pump capacity controller being further configured to perform a control in which the operating capacities of the circulation pumps are varied when the temperatures of the aqueous medium in the outlets of the usage-side heat exchangers are less than the predetermined set temperatures after the opening degree control has been performed on the flow rate adjustment valves by the opening degree controller.

9. The heat pump system according to claim 6, further comprising:
the pump capacity controller being further configured to perform a control in which the operating capacities of the circulation pumps are varied when the temperatures of the aqueous medium in the outlets of the usage-side heat exchangers are less than the predetermined set temperatures after the opening degree control has been performed on the flow rate adjustment valves by the opening degree controller.

10. A heat pump system comprising:
a heat source unit having a capacity-variable compressor configured to compress refrigerant and a heat source-side heat exchanger configured to function as a radiator of refrigerant;
a plurality of usage units connected to the heat source unit, the usage units having usage-side heat exchangers, respectively, the usage-side heat exchangers being configured to function as evaporators of refrigerant and to cool an aqueous medium;
an operating capacity controller configured to perform operating capacity control on the compressor so that an evaporation temperature of refrigerant in each of the usage-side heat exchangers reaches a first target evaporation temperature;
a temperature decision unit configured
to calculate second target evaporation temperatures at which temperatures of the aqueous medium in outlets of the usage-side heat exchangers of the respective operating usage units reach predetermined set temperatures, respectively, and
to set a minimum value of the second target evaporation temperatures as the first target evaporation temperature;
a plurality of flow rate adjustment valves configured to vary flow rates of refrigerant flowing through the usage-side heat exchangers; and
an opening degree controller configured to perform an opening degree control in which opening degrees of the flow rate adjustment valves are varied upon the first target evaporation temperature being less than the second target evaporation temperatures and the temperatures of the aqueous medium in the outlets of the usage-side heat exchangers being less than the predetermined set temperatures.

11. The heat pump system according to claim 10, wherein the opening degree controller is further configured to perform a control in which the opening degrees of the flow rate adjustment valves are reduced upon the first target evaporation temperature being less than the second target evaporation temperatures and the temperatures of the aqueous medium in the outlets of the usage-side heat exchangers being less than the predetermined set temperatures such that the temperatures of the aqueous medium in the outlets of the usage-side heat exchangers reach the predetermined set temperatures.

12. The heat pump system according to claim 11, further comprising:

aqueous medium circuits having capacity-variable-type circulation pumps configured to circulate the aqueous medium that undergoes heat exchange with refrigerant in the usage-side heat exchangers; and
a pump capacity controller configured to perform a control in which operating capacity of the circulation pumps are varied when the first target evaporation temperature is less than the second target evaporation temperatures and the temperatures of the aqueous medium in the outlets of the usage-side heat exchangers are less than the predetermined set temperatures.

13. The heat pump system according to claim 12, wherein the pump capacity controller is further configured
to control the operating capacities of the circulation pumps so that an outlet/inlet temperature difference reaches a predetermined temperature difference, the outlet/inlet temperature difference being the difference between the temperatures of the aqueous medium in the outlets of the usage-side heat exchangers and the temperatures of the aqueous medium in inlets of the usage-side heat exchangers, and
to perform a control in which the operating capacities of the circulation pumps are lowered so that the temperatures of the aqueous medium in the inlets of the usage-side heat exchangers reach a value obtained by subtracting the predetermined temperature difference from the predetermined set temperature when the first target evaporation temperature is less than the second target evaporation temperatures and the temperatures of the aqueous medium in the outlets of the usage-side heat exchangers are less than the predetermined set temperatures.

14. The heat pump system according to claim 12, further comprising:
the pump capacity controller being further configured to perform a control in which the operating capacities of the circulation pumps are varied when the temperatures of the aqueous medium in the outlets of the usage-side heat exchangers are less than the predetermined set temperatures after the opening degree control has been performed on the flow rate adjustment valves by the opening degree controller.

15. The heat pump system according to claim 10, further comprising:
aqueous medium circuits having capacity-variable-type circulation pumps configured to circulate the aqueous medium that undergoes heat exchange with refrigerant in the usage-side heat exchangers; and
a pump capacity controller configured to perform a control in which operating capacity of the circulation pumps are varied when the first target evaporation temperature is less than the second target evaporation temperatures and the temperatures of the aqueous medium in the outlets of the usage-side heat exchangers are less than the predetermined set temperatures.

16. The heat pump system according to claim 15, wherein the pump capacity controller is further configured
to control the operating capacities of the circulation pumps so that an outlet/inlet temperature difference reaches a predetermined temperature difference, the outlet/inlet temperature difference being the difference between the temperatures of the aqueous medium in the outlets of the usage-side heat exchangers and the temperatures of the aqueous medium in inlets of the usage-side heat exchangers, and to perform a control in which the operating capacities of the circulation pumps are lowered so that the temperatures of the aqueous medium in the inlets of the usage-side heat exchangers reach a value obtained by subtracting the predetermined temperature difference from the predetermined set temperature when the first target evaporation temperature is less than the second target evaporation temperatures and the temperatures of the aqueous medium in the outlets of the usage-side heat exchangers are less than the predetermined set temperatures.

17. The heat pump system according to claim 16, further comprising:
the pump capacity controller being further configured to perform a control in which the operating capacities of the circulation pumps are varied when the temperatures of the aqueous medium in the outlets of the usage-side heat exchangers are less than the predetermined set temperatures after the opening degree control has been performed on the flow rate adjustment valves by the opening degree controller.

18. The heat pump system according to claim 15, further comprising:
the pump capacity controller being further configured to perform a control in which the operating capacities of the circulation pumps are varied when the temperatures of the aqueous medium in the outlets of the usage-side heat exchangers are less than the predetermined set temperatures after the opening degree control has been performed on the flow rate adjustment valves by the opening degree controller.

* * * * *